United States Patent
Sheikh et al.

(10) Patent No.: US 10,097,765 B2
(45) Date of Patent: Oct. 9, 2018

(54) METHODOLOGY AND APPARATUS FOR GENERATING HIGH FIDELITY ZOOM FOR MOBILE VIDEO

(71) Applicant: Samsung Electronics Co., Ltd, Suwon-si (KR)

(72) Inventors: Hamid Rahim Sheikh, Allen, TX (US); Ibrahim Pekkucuksen, Plano, TX (US); John Glotzbach, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 38 days.

(21) Appl. No.: 15/134,294

(22) Filed: Apr. 20, 2016

(65) Prior Publication Data

US 2017/0310901 A1 Oct. 26, 2017

(51) Int. Cl.
| | |
|---|---|
| H04N 5/228 | (2006.01) |
| H04N 5/232 | (2006.01) |
| G06T 3/00 | (2006.01) |
| G06T 3/40 | (2006.01) |
| H04N 5/262 | (2006.01) |

(52) U.S. Cl.
CPC ....... *H04N 5/23296* (2013.01); *G06T 3/0093* (2013.01); *G06T 3/4007* (2013.01); *H04N 5/2329* (2013.01); *H04N 5/23216* (2013.01); *H04N 5/23248* (2013.01); *H04N 5/23251* (2013.01); *H04N 5/23267* (2013.01)

(58) Field of Classification Search
CPC ........... H04N 5/23296; H04N 5/23251; H04N 5/23254; H04N 5/23258; H04N 5/23264; H04N 5/23267; H04N 5/2329; G06T 3/0093; G06T 3/4007

USPC .......................................... 348/208.16, 240.2
See application file for complete search history.

(56) References Cited

U.S. PATENT DOCUMENTS

| | | | |
|---|---|---|---|
| 5,731,849 A | * | 3/1998 | Kondo ............... H04N 5/23248 348/699 |
| 7,705,884 B2 | | 4/2010 | Pinto et al. |
| 7,848,407 B2 | | 12/2010 | Yoon |
| 8,130,277 B2 | | 3/2012 | Jayachandra et al. |
| 8,335,350 B2 | | 12/2012 | Wu |
| 8,482,622 B2 | | 7/2013 | Siddiqui et al. |
| 8,571,105 B2 | | 10/2013 | Kim et al. |
| 8,571,386 B2 | | 10/2013 | Shimizu et al. |
| 8,675,080 B2 | | 3/2014 | Tian et al. |

(Continued)

OTHER PUBLICATIONS

Foreign Communication from Related Counterpart Application; PCT Application No. PCT/KR2017/004198; International Search Report dated Aug. 8, 2017; 3 pages.

(Continued)

*Primary Examiner* — Ngoc-Yen Vu

(57) ABSTRACT

The method includes in order to generate a composite image: identifying, in the frame of a video stream captured by a camera, a motion characteristic associated with moving objects in a scene while the camera captured a sliding window of the video stream. The method includes for a plurality of frames in the sliding window: controlling, by the processing circuitry, a weight of blending of the frame based on the identified motion characteristic to enable the composite image to be generated according to the controlled weights of blending of the plurality of frames in the sliding window.

37 Claims, 10 Drawing Sheets

(56) References Cited

U.S. PATENT DOCUMENTS

| | | |
|---|---|---|
| 8,867,892 B2 | 10/2014 | Li et al. |
| 8,896,697 B2 | 11/2014 | Golan et al. |
| 8,896,713 B2 | 11/2014 | Corey et al. |
| 9,113,143 B2 | 8/2015 | Seow et al. |
| 9,123,159 B2 | 9/2015 | Chen et al. |
| 9,432,575 B2 * | 8/2016 | Kuchiki ............. H04N 5/23232 |
| 9,531,962 B2 * | 12/2016 | Sezer ................... H04N 5/2628 |
| 2008/0170126 A1 * | 7/2008 | Tico ................... H04N 5/23248 |
| | | 348/208.6 |
| 2010/0079606 A1 | 4/2010 | Batur |
| 2011/0033130 A1 | 2/2011 | Poon et al. |
| 2012/0249880 A1 | 10/2012 | Li et al. |
| 2014/0341278 A1 | 11/2014 | Zheng et al. |
| 2015/0002624 A1 * | 1/2015 | Terai ................... H04N 13/139 |
| | | 348/42 |
| 2015/0036010 A1 | 2/2015 | Wu et al. |
| 2015/0163407 A1 | 6/2015 | Khoury |
| 2016/0028966 A1 | 1/2016 | Sheikh et al. |
| 2016/0042621 A1 | 2/2016 | Hogg et al. |

OTHER PUBLICATIONS

Foreign Communication from Related Counterpart Application; PCT Application No. PCT/KR2017/004198; Written Opinion of the International Searching Authority dated Aug. 8, 2017; 8 pages.

* cited by examiner

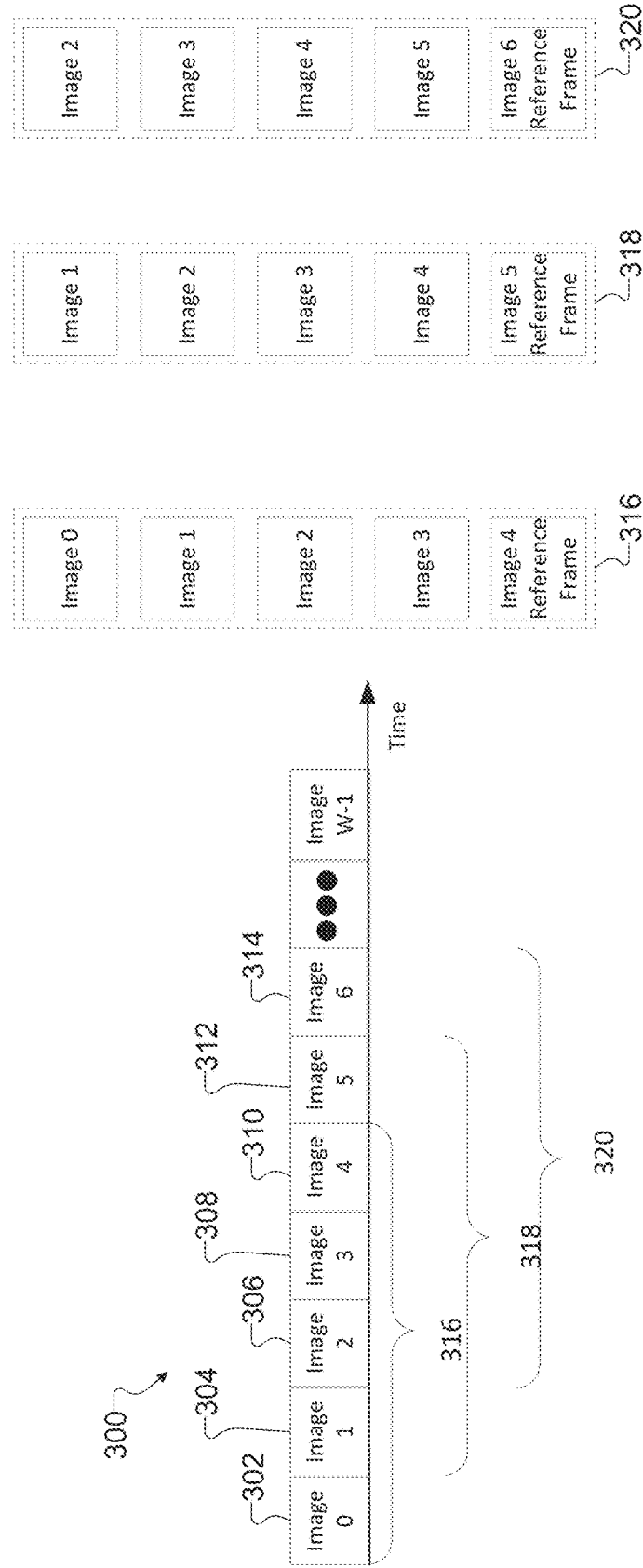

US 10,097,765 B2

METHODOLOGY AND APPARATUS FOR GENERATING HIGH FIDELITY ZOOM FOR MOBILE VIDEO

TECHNICAL FIELD

This disclosure relates generally to electronic video processing. More specifically, this disclosure relates to a methodology and apparatus for generating high fidelity zoom for mobile video.

BACKGROUND

Nearly all cell phone cameras in existence today are unable to provide optical zoom capability due to the form-factor limitations. Providing optical zoom requires large focal length lenses that make the thickness of smartphones too large for average consumers. This is why nearly all smartphones provide only digital zoom capabilities in their cameras, where the zoom effect comes only from digital methods and not optical methods.

Digital zoom methods generally consist of interpolation algorithms such as Bicubic interpolation, poly-phase interpolation, or other such methods. These digital zoom methods process only one frame at a time. The key issue with digital zoom algorithms is that for large zoom factors (such as 4x or higher), the artifacts and noise in the image, which are not objectionable without zoom, are amplified and enlarged by the interpolation algorithm. The resulting image quality is not acceptable to most users.

As described in U.S. patent application Ser. No. 14/690, 046, titled "METHODOLOGY FOR GENERATING HIGH FIDELITY DIGITAL ZOOM FOR MOBILE PHONE CAMERAS," it is possible to use multiple frames together to provide High Fidelity Digital Zoom—referred to as HiFi Zoom for Still Images in this disclosure. Such methods utilize multiple frames and rely on the fact that there is a small difference in position of the camera due to hand-shake to minimize the artifacts from digital interpolation, improve signal to noise ratio, improve clarity and sharpness of the video, perceived detail and overall perceptual quality of images. Such methods are very complex, and extending such methods to videos is not straightforward for someone skilled in the art.

SUMMARY

This disclosure provides a methodology and apparatus for generating high fidelity zoom for mobile video.

In a first embodiment, an apparatus includes processing circuitry. The processing circuitry is configured to, in order to generate a composite image: identify, in the frame of a video stream captured by a camera, a motion characteristic associated with moving objects in a scene while the camera captured a sliding window of the video stream; and for a plurality of frames in the sliding window, control a weight of blending of the frame based on the identified motion characteristic to enable the composite image to be generated according to the controlled weights of blending of the plurality of frames in the sliding window.

In a second embodiment, a method includes in order to generate a composite image: identifying, in the frame of a video stream captured by a camera, a motion characteristic associated with moving objects in a scene while the camera captured a sliding window of the video stream. The method includes for a plurality of frames in the sliding window: controlling, by the processing circuitry, a weight of blending of the frame based on the identified motion characteristic to enable the composite image to be generated according to the controlled weights of blending of the plurality of frames in the sliding window.

In a third embodiment, a non-transitory computer readable medium embodying a computer program is provided. In order to generate a composite image, the computer program includes computer readable program code that when executed causes at least one processing device to: identify, in a frame of a video stream captured by a camera, a motion characteristic associated with moving objects in a scene while the camera captured the sliding window; and for a plurality of frames in the sliding window, control a weight of blending of the frame based on the identified motion characteristic to enable the composite image to be generated according to the controlled weights of blending of the plurality of frames in the sliding window.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 3A illustrates an example video stream according to this disclosure;

FIG. 3B illustrates examples of an N-frame sliding window within the video stream of FIG. 3A.

DETAILED DESCRIPTION

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

This disclosure provides a methodology (e.g., algorithms) and apparatus that provide a high quality zoom effect for video capture. Embodiments of the present disclosure provide a methodology of producing High Fidelity (HiFi) Zoom video on mobile phones or other video processing device. Embodiments of the present disclosure provide an improved user interface, a system use case implementation, and a multi-frame computational imaging algorithm to improve the quality of digitally zoomed video. Embodiments of this disclosure also provide the application, a user experience design, video camera firmware configuration, algorithm and implementation for enabling a combining of multiple frames to generate artifact free high quality video. Embodiments of this disclosure also produce zoomed images that have better image rendering, improved signal to noise ratio, more natural texture rendering, and improved clarity of objects in the zoomed video. The multi-frame computational imaging algorithm is able to handle moving objects in a scene, as well as distinguish intended motion of the camera from hand-shake camera motion from frame to frame. The multi-frame computational imaging algorithms perform well in terms of power, computational complexity, memory bandwidth, and latency in embedded implementations (for example, embedded in a mobile phone).

Figure 1:
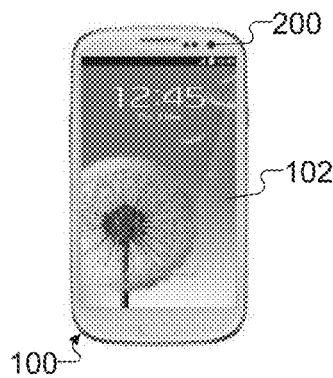
FIG. 1 illustrates an example user equipment for generating High Fidelity Zoom for a mobile video according to this disclosure.

FIG. 1 illustrates an example user equipment (UE) 100 for generating High Fidelity for a mobile video according to this disclosure.

The UE 100 includes an electronic display 102 and an embedded camera 200 disposed on the front side of the UE. The display 102 displays information of an application executed by the processing circuitry of the UE 100. The camera 200 captures video in a high resolution digital format, but the camera 200 is not configured to perform an optical zoom. The UE 100 includes processing circuitry, including one or more processors and memory, configured to control an operation of the UE 100, control an operation of the display 102 and control and operation of the camera 200. The UE 100 can include independent processing circuitry for each of the display 102, camera 200 and for control of the UE 100 that are configured to intercommunicate and cooperate with each other to perform one or more functions described herein. In certain embodiments, one of more of the display 102, camera 200 and UE 100 control functions are performed by a common, or shared, processing circuitry.

Although FIG. 1 illustrates one example UE 100, various changes may be made to FIG. 1. For example, each component of the UE 100 could have any other size, shape, and dimensions.

Figure 2:
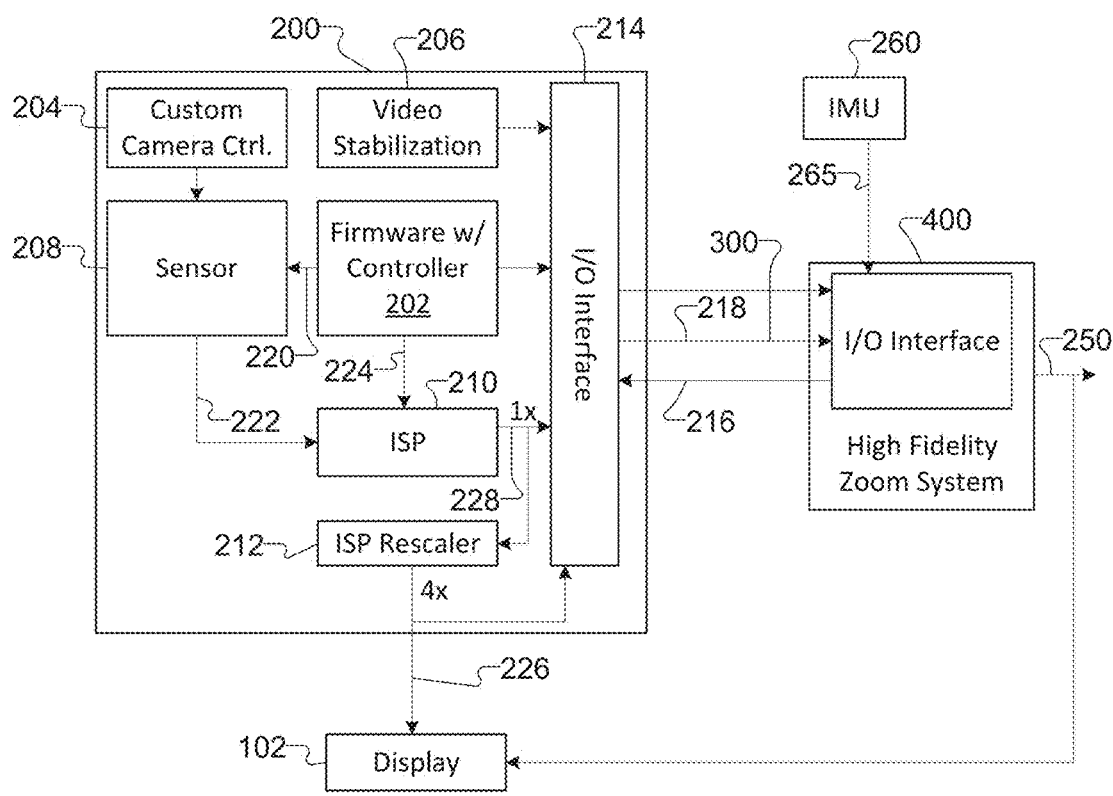
FIG. 2 illustrates an example block diagram of components within the user equipment of FIG. 1 for implementing the High Fidelity Zoom for a mobile video according to this disclosure.

FIG. 2 illustrates an example block diagram of components within the user equipment of FIG. 1 for implementing the High Fidelity Zoom for a mobile video according to this disclosure.

The camera 200 includes a camera controller with firmware 202, a custom camera control module 204, an video stabilization module 206, a sensor 208, an image signal processor (ISP) 210, an ISP rescaler 212, and an input/output (I/O) interface 214. The camera 200 is connected to the system 400 for mobile video High Fidelity Zoom (herein also referred to as "mobile video HiFi Digital Zoom system") in order to operate in a High Fidelity Zoom video mode ("HiFi video mode") and to receive control signals 216 from, and send control signals 218 and a video stream 300 to the mobile video HiFi Digital Zoom system 400. The I/O interface 214 receives data from and sends data to the I/O interface of the mobile video HiFi Digital Zoom system 400.

HiFi video mode is a special mode on a video camera application of a mobile phone or the UE 100. HiFi video mode can be automatically selected based on zoom ratio (for example, >2× or other threshold digital zoom ratio) or automatically selected based on a videography mode (for example, a pre-selected quality level requirement) or selected manually by the user. Herein, automatic refers to action resulting from a prior operation without human operator intervention. For example, the camera 200 can automatically (namely, without human interaction) select to operate in HiFi video mode in response to a determination that the zoom ratio exceeds a threshold value. The threshold value may indicate a maximum zoom ratio of the non-HiFi normal mode of the camera 200. Once the HiFi video mode is selected and the user zooms in to take a capture video, the video camera application switches sensor mode back to a 1× zoom ratio, configures the video camera firmware to an application-specific "tuning" parameter set, and captures a video stream 300. In certain moments, the user may intend to keep the video camera stationary, for example to capture video of a choir singing or a talking head. Despite the fact that the user tries determinedly to hold the camera stable, the hand of the user cannot avoid micro-movements of the camera. These micro-movements cause the camera 200 to capture the video stream 300 wherein each frame is from a slightly different position. In other moments, the user may intend to change the field of view of the camera, such as by panning in a horizontal plane or tilting in a vertical plane. Once the mobile video High Fidelity Zoom algorithm has been applied to the an N-frame sliding window (described more particularly below with reference to FIG. 3B) of the video stream, the resulting composite frame 250 is displayed to the user or saved in the memory of the UE 100 as a frame within a video file, wherein the video file can to be stored for the camera application video gallery. More particularly, upon being turned on, the mobile video HiFi Digital Zoom system 400 can provide the composite frame 250 to the display 102 to enable a user to view the composite frame 250 of the output video stream.

The camera controller with firmware 202 includes signal processing circuitry and a memory within the UE 100 that stores program code that provides the control program of the camera 200. The camera controller with firmware 202 controls the functions of each of the other camera components 208-214 using control signals or control parameters. The off status or unlocked state of the 3A lock enables the camera 200 to capture video as a continuous stream of pictures in which scene brightness, colors, and other characteristics are constantly changing. The auto-exposure lock, auto-focus lock, and auto white/color balance lock are collectively referred to as the 3A lock. As a result, user intended camera motion can result in motion-induced blur in the frames of the video stream 300. The mobile video High Fidelity Zoom algorithm uses this knowledge of motion-induced blur as a basis for controlling to provide an optimal quality composite frame 250, such as by controlling the weight of blending that a frame experiences based on its motion blur characteristics. That is, the weight of blending determines brightness normalization, color normalization, and scale normalization in multi-frame blending algorithms.

In the non-HiFi normal mode, when the user zooms in to capture video, the frame output from the ISP 210 is output from the ISP Rescaler 212 at the selected zoom ratio (for example, 1.3×) that is greater than 1×. In HiFi video mode, the camera application instructs the camera firmware 202 to switch mode back to a 1× zoom ratio and output smaller resolution buffers. More particularly, when the user zooms in to capture video at a zoom ratio (for example, 4×) high enough for the camera 200 to implement HiFi video mode, the firmware 202 generates ISP control parameters 224 that cause the ISP 210 to output each image in the burst of images 300 at a 1× zoom ratio. The 1× resolution images enable the mobile video HiFi Digital Zoom system 400 to perform interpolation and processing on the video stream 300. In another embodiment, a scale factor other than 1× may be input into the mobile video HiFi Digital Zoom system 400 by using the ISP rescaler 212 or other upscaling methods. The camera application reconfigures the camera firmware 202 to generate "tuning" parameters 224 that are more suitable for image texture retention. The custom "tuning" parameters 224 include parameters for defect pixel correction, noise filtering, color filter array interpolation (demosaicing), sharpness enhancement, and so forth. These custom tuning parameters 224 retain image information but may produce undesirable image effects in a single image 228. The undesirable effects are mitigated through blending of multiple frames, while the benefits (improved texture rendition) are not reduced by multi-frame blending. Re-configuration of the camera firmware 202 enables the ISP 210 to perform reduced noise filtering, reduced pixel defect correction, and reduced interpolation aliasing cancelation. Re-configuration of the camera firmware 202 causes the ISP 210 to generate poorer quality images compared to a normal photo capture scenario, but also, the mobile video High Fidelity Zoom system 400 produces a higher fidelity output composite frame 250 by blending multiple images of the video stream 300. As described more particularly below with reference to FIG. 4, the mobile video HiFi Digital Zoom system 400 includes noise filtering, defect pixel reduction, and aliasing reduction. The ISP tuning parameters 224 cause each image of the video stream 300 to have poorer quality than the blended output composite frame 250.

The custom camera control module 204 enables the camera 200 to capture a video stream 300 to receive a HiFi request for custom cameral control, and based thereon, select to either (i) turn off or unlock the 3A lock in order to implement the HiFi video mode, or (ii) turn on or lock the 3A lock in order to implement a HiFi Zoom for Still Images.

The sensor 208 can be an image sensor that captures a raw image 222 by converting light to an electric signal. The sensor 208 receives sensor control parameters 220 from the camera controller with firmware 202 to control the exposure, white/color balance, and focus. In HiFi video mode, the sensor control parameters 220 include an off status of the 3A lock while capturing each of the images during the capturing of each raw image 222 for the video stream 300.

The ISP 210 receives each raw image 222 captured by the sensor 208 and receives parameters 224 to control the quality of the images output from the ISP 210. Based on the parameters 224, the ISP 210 leaves the images in raw format or improves the quality of each raw image 222 by applying a noise reduction filter, a defect pixel correction, a color filter array interpolation (for example, demosaicing), and a sharpness enhancement process. The ISP outputs the processed image 228 to the mobile video HiFi Digital Zoom system 400. The parameters 224 can be generated by and received from the mobile video HiFi Digital Zoom system 400 or the camera controller with firmware 202. In the non-HiFi normal mode, the ISP 210 receives parameters 224 from the camera controller with firmware 202, which are parameters that cause the ISP 210 to remove noise and aliasing from images and to output high quality images. As described more particularly below, the mobile video HiFi Digital Zoom system 400 includes one or more pre-processing components, such as a noise filter and a pre-sharpener. Accordingly, when operating in the HiFi video mode, the camera 200 need not duplicate the noise and aliasing removal that occurs in the pre-processing components of the mobile video HiFi Digital Zoom system 400. In certain embodiments, the noise filtering and pre-sharpening is part of the ISP 210, which can be placed under appropriate control of the HiFi system. That is, in the HiFi video mode, the ISP 210 receives parameters 224 from the mobile video HiFi Digital Zoom system 400, which are parameters that cause the ISP 210 to remove a lesser amount of noise and aliasing than the amount of noise and aliasing that would be removed by the parameters generated by the camera controller with firmware 202. In certain embodiments, parameters 224 from the mobile video HiFi Digital Zoom system 400 cause the ISP 210 to bypass the noise removal, the aliasing removal, or both noise and aliasing removals. Accordingly, the images 228 output from the ISP 210 in HiFi video mode may have more noise or aliasing than the images output from the ISP 210 in non-HiFi normal mode.

In Hi-Fi video mode, the composite frame 250 is displayed provided to the display 102, in which case the display 102 shows the composite frame 250 to the user. The ISP rescaler 212 rescales the resolution of the image 228 output from the ISP 210, for example, to an intermediate zoom ratio other than 1× (for example, 1.2× or 4×) and provides the rescaled image 226 to I/O interface 214 to be sent to the mobile video HiFi Digital Zoom system 400. In certain embodiments, the ISP rescaler 212 is included within the ISP 210. When the ISP rescaler 212 is part of the ISP 210, in HiFi video mode, the ISP 210 either outputs the image 228 to the I/O interface 214 at a 1× resolution or outputs the rescaled image 226 the I/O interface 214 at the intermediate resolution (for example, 1.2× or 4×). In non-HiFi normal mode, the ISP rescaler 212 may additionally send the rescaled image 226 to the display 102.

The video stabilization module 206 detects uniform distortion between images and registers a set of points where the distortion is present. For example, when the UE 100 is in the hand of a user while capturing a video stream, which can include multiple frames of the same scene, a first image of the scene is captured while the camera 200 was horizontally level at a 0° angle, yet due to a slight movement of the user's body, the camera moves to a 3° angle to capture the second image of the scene. The video stabilization module 206 can use the first image as a reference frame to detect the points in the second image of the scene that are slightly displaced compared to the position of the point in the first image reference frame. The video stabilization module 206 receives each raw image 222 captured by the sensor 208, and then outputs video stabilization information including the set of displaced points and the corresponding amounts by which the displaced points were linearly and/or angularly translated. In certain embodiments the mobile video HiFi Digital Zoom system 400 receives and uses the camera affine information to perform a mobile video High Fidelity Zoom process. The video stabilization module 206 can use affine registration as a process to achieve stabilization, and may produce camera affine information (e.g., affine matrices) or other such parameters.

The mobile video HiFi Digital Zoom system 400 receives a video stream 300 from the camera 200, and then uses a sliding window of the video stream images 300 to generate a composite frame 250. The mobile video HiFi Digital Zoom system 400 applies a mobile video High Fidelity Zoom algorithm, both of which are described in further detail in reference to FIG. 4.

Although FIG. 2 illustrates one example components within the user equipment 100, various changes may be made to FIG. 2. For example, each component of the UE 100 could have any other size, shape, and dimensions. As another example, the UE 100 could include an inertial measurement unit 260 (IMU), such as a compass, a gyroscope, and/or accelerometers, which provide camera motion information in the form of inertial measurements 265 that indicate rotation, translation, speed, and acceleration of the camera 200 while the camera captures each raw frame 222 of the video stream 300. As another example, FIG. 12 shows that the camera 200 could be replaced by a video playback device 1200, which provides the video frames of the video stream 300 to the mobile video HiFi Digital Zoom system 400.

FIG. 3A illustrates an example video stream 300 captured according to this disclosure. The embodiment of the video stream 300 shown in FIG. 3 is for illustration only. Other embodiments could be used without departing from the scope of the present disclosure.

The camera 200 captures the video stream 300 at a capture rate, such as 30 frames per second (fps). The video stream 300 can include several frames, such as a number W of frames including, such as a first frame 302 (IMG0), a second frame 304 (IMG1), a third frame 306 (IMG2), a fourth frame 308 (IMG3), a fifth frame 310 (IMG4), a sixth frame 312 (IMG5), a seventh frame 314 (IMG6), and subsequent frames (also shown by an ellipsis indicating frames between the seventh and last frames of the video stream), and a last frame (IMGW-1).

Each frame is included in a sliding window 316, 318, 320 that includes a number N of frames. The number N can be selected based on a pre-determined calculation of system capabilities (for example, hardware capabilities, processor processing power, memory size, memory bandwidth, etc.). In certain embodiments, N may change dynamically depending on zoom ratio, power consumption, camera ISO, image noise, or other system resource constraint. For example, if N=5, then each sliding window 316, 318, 320 includes a first through Nth frame. The first sliding window 316 includes the first frame 302 (IMG0), a second frame 304 (IMG1), a third frame 306 (IMG2), a fourth frame 308 (IMG3), and a fifth 310 (IMG4). The camera 200 captures the sliding window during an amount of time that elapses from the time the camera 200 commences to capture the first frame 302 and the time the camera 200 finishes capturing the last frame 310 of the sliding window. In a similar manner, the second sliding window 318 includes the second through sixth frames (IMG1 . . . IMG5), and the third sliding window 320 includes the third through the seventh frames (IMG2 . . . IMG6).

FIG. 3B illustrates examples of an N-frame sliding window within the video stream of FIG. 3A. Although three sliding windows 316, 318, 320 are shown, the video stream 300 can include more or fewer sliding windows.

Figure 4A:
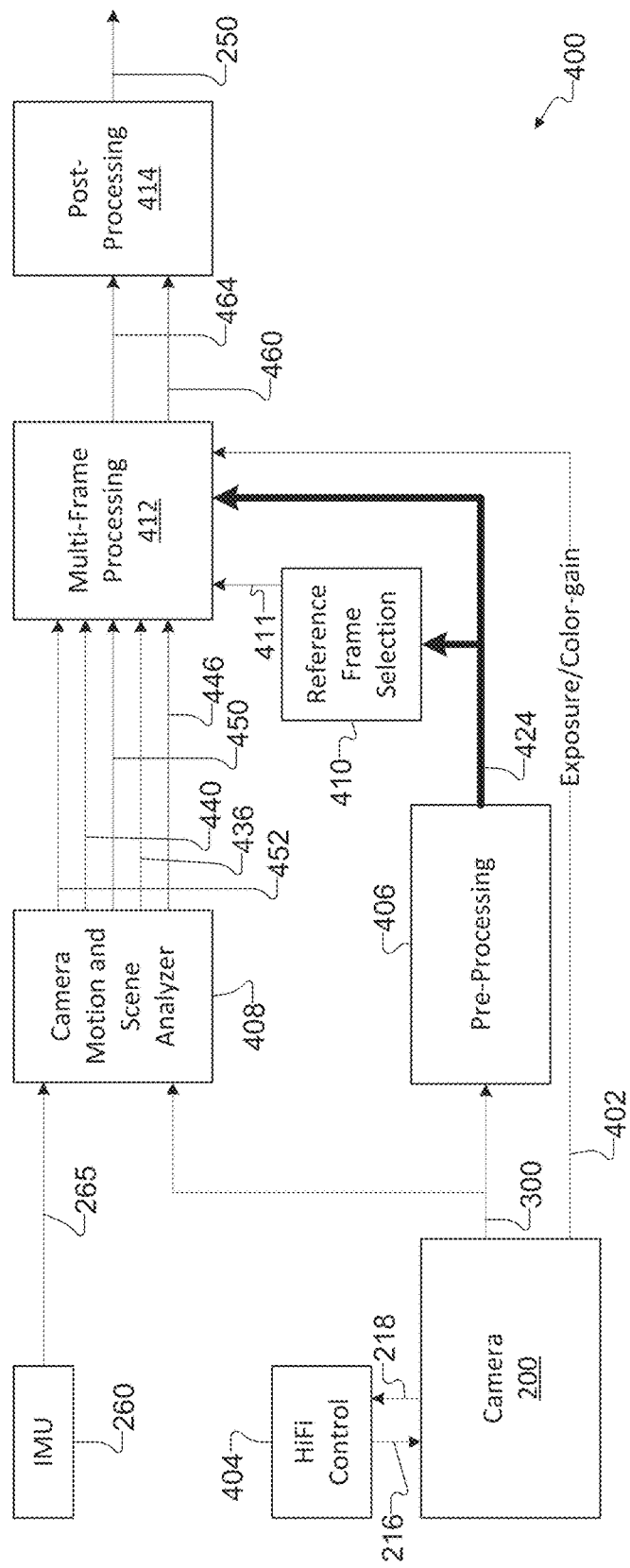
FIGS. 4A and 4B illustrate an example system for implementing the High Fidelity Zoom for a mobile video according to this disclosure.
Figure 4B:
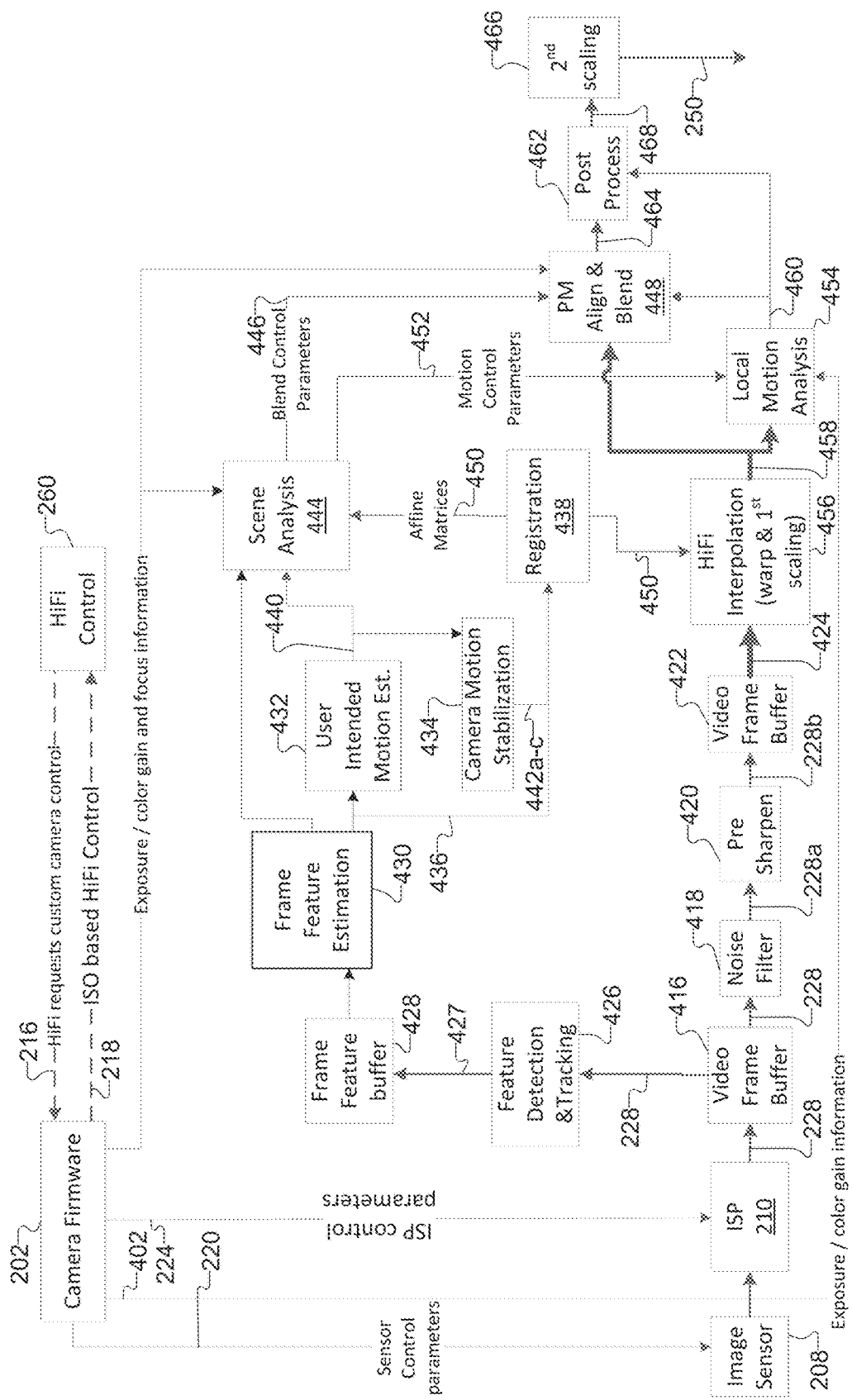

FIGS. 4A and 4B illustrate an example system 400 for implementing the High Fidelity Zoom for a mobile video according to this disclosure.

As shown in FIG. 4A, the system 400 for implementing the High Fidelity Zoom for a mobile video reduces re-computations by partitioning the mobile video High Fidelity Zoom algorithm such that few components run in a multi-frame processing manner, while providing a same image quality as compared to the HiFi Zoom for Still Images.

The mobile video HiFi Digital Zoom system 400 is coupled (for example, connected) to the IMU 260 to receive the camera motion information 265.

The HiFi Digital Zoom system 400 is coupled to the camera 200 to receive each frame 302-314 captured as part of the video stream 300. In the embodiment shown, the mobile video HiFi Digital Zoom system 400 receives the video stream 300 from the camera 200, which outputs a single frame 228 at a time, according to the capture frame rate. The mobile video HiFi Digital Zoom system 400 may also receive focus, exposure, and color gain information 402 from the camera 200. As described above, the mobile video HiFi Digital Zoom system 400 receives control signals 218, including a camera ISO (International Organization for Standardization) based HiFi Control signal from the camera 200, and sends control signals 216, including a HiFi request for custom camera control, to the camera 200. The control signals 216 can modify the ISP 210 for noise filtering, demosaicing configuration, sharpness enhancement, defect pixel correction, color or exposure.

The mobile video HiFi Digital Zoom system 400 includes the HiFi Control module 404, pre-processing module 406, a camera motion and scene analyzer 408, a reference frame selection module 410, a multi-frame processing module 412, and a post-processing module 414. The pre-processing module 406 and post-processing module 414 are separate from the align-and blend algorithms that are implemented by the multi-frame processing module 412. The pre-processing module 406 and post-processing module 414 operate at the capture frame rate, yet the align-and blend algorithms are implemented according to a rate that is N times the capture frame rate (also referred to as a normal frame rate), where N is a multi-frame factor identifying the number of frames in the sliding window 316, 318, 320.

The reference frame selection module 410 reduces latency of capturing a raw frame 222 and outputting a composite frame 250 by selecting a most recent frame to be the reference frame. This end-to-end latency optimizing frame selection in the reference frame selection module 410 causes the system 400 to output an eighth composite frame before a tenth raw frame is captured. By way of comparison, a two frame latency is associated with selecting a middle frame, such as the third of five frame in a sliding window. In other embodiments, the reference frame selection module 410 could choose some other frame in the sliding window as reference using other criteria such as least probable motion distortion, in which case the center frame (i.e., Image 3 of subsequent sliding window 318) can be selected.

Details regarding components and operations of the mobile video HiFi Digital Zoom system 400 are described more particularly below with reference to FIG. 4B.

Although FIG. 4A illustrates one example mobile video HiFi Digital Zoom system 400, various changes may be made to FIG. 4. For example, the post-processing modules 414 could implement a multi-frame post-processing algorithm such that the post-processing modules 414 could be included in the multi-frame processing module 412 and operate at the rate that is N times the capture frame rate.

Figure 7:
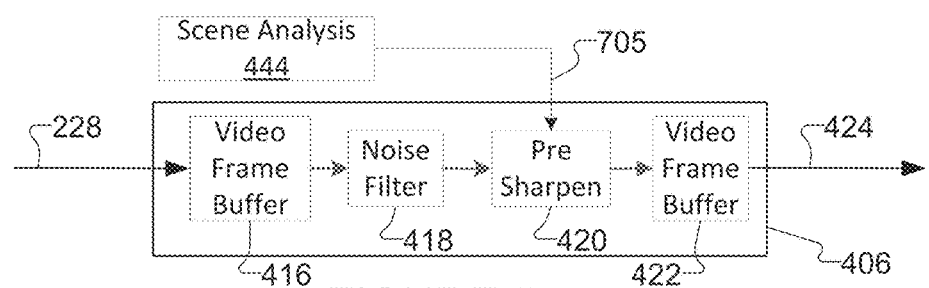
FIG. 7 illustrates an example components within the pre-processing block of the system of FIGS. 4A and 4B.

As shown in FIG. 4B, the mobile video HiFi Digital Zoom system 400 for implementing the High Fidelity Zoom for a mobile video includes a first video frame buffer 416, a noise filter 418, a pre-sharpener 420, and a second video frame buffer 422, each of which are included in the pre-processing module 406 (as shown in FIG. 7). The first frame buffer 416, in response to receiving the video steam 300 as a single frame 228 at a time from the ISP 210, stores the single frame 228.

The noise filter 418 obtains the single frame 228 from the first video frame buffer 416, and applies a noise filter to it in order to remove noise from each frame in the video stream 300. Accordingly, the noise filter 418 reduces the amount of noise processed within the later stages. The output from the noise filter 418 is a noise-filtered version 228a of the single frame 228.

The pre-sharpener 420 obtains the noise-filtered version 228a of the single frame, and sharpens it to reduce an amount of blur processed within the later stages. The output from the pre-sharpener 420 is a pre-sharpened version 228b of the single frame, also referred to as a pre-processed frame.

The second video frame buffer 422 obtains the pre-sharpened version 228b of the single frame and stores it. The second video frame buffer 422 accumulates pre-processed frames to store a full N-frame sliding window. For example, the second video frame buffer 422 continues to store pre-processed versions of the first through fifth frames 302-310 (IMG0-IMG4) until the first sliding window 316 is stored. The output from the second video frame buffer 422 is N-frames at once, namely, a sliding window 424, which can include the first sliding window 316 or any subsequent sliding window 318, 320.

Figure 6:
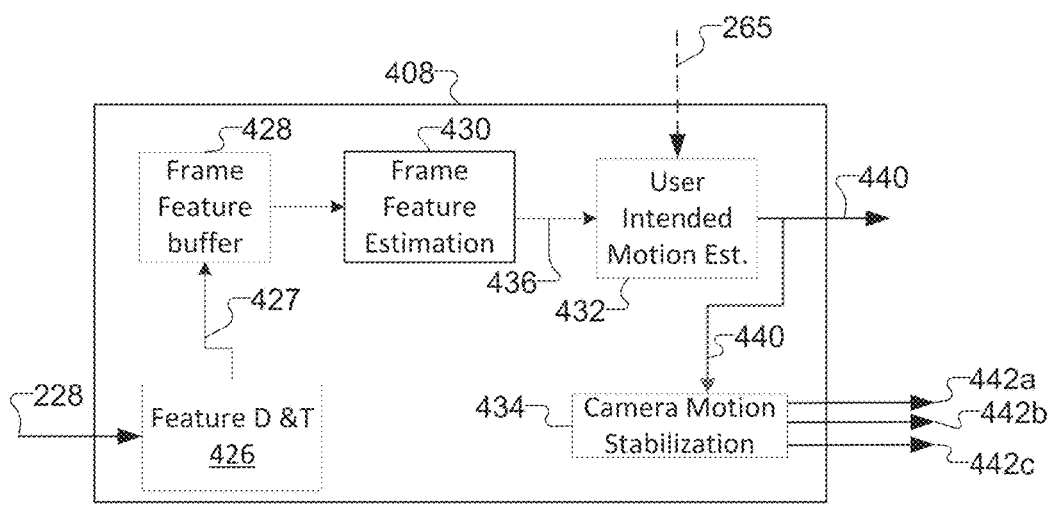
FIG. 6 illustrates an example camera motion processing block the system of FIG. 4B.

The mobile video HiFi Digital Zoom system 400 further includes a feature detection and tracking module 426, a frame feature buffer 428, a frame feature estimator 430, a user intended motion estimator 432, and a camera motion stabilizer 434, each of which is included in the camera motion and scene analyzer 408 (as shown in FIG. 6). The camera motion and scene analyzer 408 does not operate based on an assumption that the user intends to maintain the camera 200 in a stationary position while capturing video. The camera motion and scene analyzer 408 operates based on an assumption that part of the camera motion is intended camera motion that is intended by the user, for example when the user pans or tilts the camera 200 during video capture. The mobile video HiFi Digital Zoom system 400, particularly the camera motion and scene analyzer 408, analyzes camera motion and decomposes camera motion into user-intended camera motion and hand-shake camera motion.

The feature detection and tracking module 426 obtains the single frame 228 from the first video frame buffer 416, and performs feature detection according to a detection frame rate and performs feature tracking according to a tracking frame rate. The feature detection and tracking module 426 outputs true calculations 427 of frame feature relationships to the frame feature buffer 428. According to this disclosure, the detection frame rate is each less than or equal to the capture frame rate, and the tracking frame rate is less than or equal to N times the capture frame rate. The tracking frame rate may be such that the detection frame rate and tracking frame rate add up to the capture frame rate (e.g., 30 fps), or have redundancy in the calculations for robustness. That is, the feature detection and tracking module 426 performs feature detection at the detection frame rate, for example 15 fps or 10 fps, and tracks points in between. The frame feature buffer 428 maintains a list of points that match from each of the frames in the N-frame sliding window. That is, the frame feature buffer 428 accumulates and stores frame feature information corresponding to N-frames. The user intended motion estimator 432, camera motion stabilizer 434, and scene analyzer 444, operate at the capture frame rate. As described more particularly below, the registration module 438 performs motion estimation at the rate that is inclusively between the capture frame rate and N times the capture frame rate, for example 150 fps.

As a specific example, each sliding window includes N=5 frames captured at a capture frame rate of 30 fps. The feature detection and tracking module 426 can apply detection to every other frame by applying the detection frame rate of 10 fps. The third frame 306 (IMG2) would have detection applied by the feature detection and tracking module 426, causing the frame feature buffer 428 to store a calculation of the detection D2. In the first sliding window 316, the feature detection and tracking module 426 applies tracking to the first frame 302 (IMG0) with reference forward to the third frame 306 (IMG2), thereby causing the frame feature buffer 428 to store a calculation of the tracking relationship T02. The feature detection and tracking module 426 would apply tracking to the second frame 304 (IMG1) with reference forward to the third frame 306 (IMG2), thereby causing the frame feature buffer 428 to store a calculation of the tracking relationship T12. The feature detection and tracking module 426 would apply tracking to the fourth frame 308 (IMG3) with reference forward to the third frame 306 (IMG2), thereby causing the frame feature buffer 428 to store a calculation of the tracking relationship T32. The feature detection and tracking module 426 would apply tracking to the fifth frame 310 (IMG4) with reference forward to the third frame 306 (IMG2), thereby causing the frame feature buffer 428 to store a calculation of the tracking relationship T42.

Next, in the second sliding window 318, the frame feature buffer 428 already stores true calculations 427 of the tracking relationships T12, T32, T42. Instead of applying a detection to the fourth frame 308 (IMG3), the frame feature estimator 430 can estimate the respective tracking relationships T13 and T23 of the second frame 304 (IMG1) and the third frame 306 (IMG2) with reference forward to the fourth frame 308 (IMG3). The tracking relationship T13 could be estimated as a function f(T12, T32) of previously calculated relationship values, such as the sum of T12 with the reverse of T32. The tracking relationship T23 could be estimated as a function f(T32) of previously calculated relationship values, such as being equivalent to the reverse of T32. That is, no additional tracking or detection algorithms are applied to the frames 304-310 that are common to both the first sliding window 316 and second sliding window 318. Instead of applying an additional tracking to the fifth frame 310 (IMG4) with reference to the third frame 306, the frame feature estimator 430 can estimate the tracking relationship T43 as a function f(T42, T32) of previously calculated relationship values, such as the difference of T42 minus T32. The feature detection and tracking module 426 applies a tracking algorithm to the sixth frame 312 (IMG5) in order to determine a true calculation 427 (as distinguished from an estimate performed by the frame feature estimator 430) of the tracking relationship T53 with reference back to the third frame 306.

The frame feature estimator 430 provides frame feature information 436 to the registration module 438. The frame feature information 436 includes the true calculations 427 of the detected features, such as D2 and D5 corresponding to the third and sixth frames 306 and 310, obtained from the frame feature buffer 428. The frame feature information 436 additionally includes the true calculations 427 of the tracking relationships, such as T12, T32, T42, obtained from the frame feature buffer 428. The frame feature information 436 also includes the estimates of the tracking relationships, such as T13, T23, T43 estimated by the frame feature estimator 430. The frame feature information 436 can be used by the registration module 438 to analyze an amount of warp correction required for each frame.

In another non-limiting example, the feature detection and tracking module 426 can apply detection to every third frame by applying the detection frame rate of 10 fps. For sake of comparison, in an example naïve implementation, each N-frame sliding window is treated as a separate instance of HiFi Zoom for Still Images, which is suboptimal for computational efficiency. The feature detection is performed at the capture frame rate of 30 fps; the feature tracking is performed at 120 fps, which is (N−1) times the capture frame rate; and motion estimation is performed at 150 fps, which N times the capture frame rate. In the naïve implementation, the detection computation is applied to one of every N frames, and the tracking computation is applied to each of the remaining N−1 frames.

The user intended motion estimator 432 identifies and describes user intended motion so that each composite frame 250 that forms a video file retains motion that the user intended. The user intended motion estimator 432 receives camera motion information, which includes the frame feature information 436, and can additionally include inertial measurements 265. The user intended motion estimator 432 estimates the camera motion, which includes determining a speed and direction of movement the user intended camera motion using the received camera motion information. In certain embodiments, the user intended motion estimator 432 applies digital methods to estimate the camera motion. In other embodiments, the user intended motion estimator 432 applies methods based on inertial measurements 265 in combination with digital methods to estimate the camera motion. As described more particularly below with reference to FIG. 9, received or estimated camera motion information can include orientation and/or displacement of the camera 200 and a time of capture corresponding to each frame (IMG0 through IMGW-1) of the video stream 300, which can be plotted on a graph 900 showing displacement in a particular direction versus time. The user intended camera motion information 440 generated and output from the user intended motion estimator 432 can be represented as a function of time and displacement in a particular direction, such as a horizontal panning direction (represented as an x-axis 905).

The camera motion stabilizer 434, in response to receiving the user intended motion information 440, determines the hand-shake camera motion, represented as hand-shake camera motion information 442a, camera stabilization path, represented as displacement and/or orientation values 442b and camera motion distortion information 442c (such as that introduced by CMOS Electronic Rolling Shutter distortion). The camera motion stabilizer 434 sends the hand-shake camera motion information 442a, camera stabilization path 442b, and camera motion distortion information 442c to the registration module 438. The camera motion stabilizer 434 determines the intended location and/or orientation at which the user-intended to capture as the value of the user intended motion information 440 at the time of capture of each frame of the video stream 300. For each frame in the video stream 300, the camera motion stabilizer 434 determines a variance (reference number 910a, 910b in FIG. 9) between the intended location and/or orientation (reference number 915a) at which the user-intended to capture the frame and the actual location and/or orientation (reference number 920a) at which the camera captured the frame. In certain embodiments, the camera motion stabilizer 434 may select to stabilize to a somewhat different path than the user intended camera path for aesthetic reasons. That is, to make the intended camera motion path aesthetically pleasing, camera motion stabilizer 434 can generate the camera stabilization path 442b to be a function of the user intended camera motion path 440 by removing sudden jerks (e.g., variance 910a outside the threshold 930). Also for each frame in the video stream 300, hand-shake camera motion information 442a includes a matrix of values representing the variances, enabling the registration module 438 to remove hand-shake camera motion from the points of distortion among the sliding window.

The scene analyzer 444 determines the suitability of the scene for blending. The scene analyzer 444 does so by determining the amount of motion occurring within the scene captured in each sliding window. The scene analyzer 444 analyzes each frame of the video stream with reference to other frames within the corresponding sliding window to determine the motion blur characteristics of the frame, including an amount of motion in the frame, and motion induced blur. The scene analyzer 444 generates blend control parameters 446 indicating a weight of blending for each frame in a sliding window. In order to provide optimal quality of a video file, the scene analyzer 444 controls the weight of blending that a frame experiences based on its motion characteristics such as total motion present in the frame, estimated motion blur, and relative time difference between the frame being blended and the reference frame. The scene analyzer 444 selects which images within the sliding window will be blended together to form the composite framed 250 and with what relative contribution. In response to determining that an image has too much motion, or has too much difference in color, brightness or focus, in order to improve the blending process, the scene analyzer 444 can select to drop the image from being transferred to the photometric (PM) align and blend processing block 448. That is, the scene analyzer 444 selects which images to reject or otherwise not transfer to the align and blend processing block. The weight of blending indicates the strength that align and blend processing block should apply to corresponding image. An image with a zero weight can be eliminated from the blending process or not relied upon by the PM align and blend processing block 448, and an image with a largest weight can be relied upon heavily for the blending process.

The scene analyzer 444 resets the frame feature detection and tracking corresponding to the current sliding window upon a determination that that too much motion has occurred between two of more frames in the current sliding window, or that tracking results are unreliable due to other reasons such as too much noise in the system, differences in brightness, color or focus, or a lack of consensus among tracking judgments regarding camera motion. The frame feature detection and tracking can be reset by instructing the feature detection and tracking module 426 to perform additional detection and tracking for a particular frame that has an erroneous estimated tracking relationship value, such as T43. The scene analyzer 444 can determine that too much motion has occurred between two of more frames in the current sliding window by determining that an amount of motion associated with a frame exceeds a frame tracking reliability threshold (indicating a required reliability of feature detection and feature tracking). The scene analyzer 444 can determine that too much motion has occurred between two of more frames in the current sliding window by determining that too many of the feature points in are lost, for example lost from the list of matching feature points.

The scene analyzer 444 receives frame alignment and transformation information, such as but not limited to warp parameters 450, affine matrices, projective transform matrices, or generic warp parameters, from the registration module 438, and uses the affine matrices (or other transformation parameter) to avoid interpreting warp as object motion within a scene. For example, if the user capture video a mountain scene with a clear sky (for example, no visible clouds), the scene analyzer 444 can determine that nothing in the scene is moving because in all N images of the sliding window, the mountains and ground are stationary, and no visible clouds are moving. As another example, if the user captures video of the same mountain scene, yet during two of the five images, an insect flies across a horizontal centerline of the scene within view of the camera 200 lens or sensor 208, then the scene analyzer 444 can determine that a small amount (namely, one insect object, one direction, few frames) of movement is occurring in the scene. As another example, if the user captures video of the same mountain scene, yet in all of the N images of the sliding window, tree foliage being blown in various directions by wind occupies a top right-hand corner of the view of the camera lens or sensor 208, then the scene analyzer 444 can determine that a large amount (namely, several leaf objects, various directions, all frames) of movement is occurring in the scene. Additionally, the scene analyzer 444 generates motion control parameters 452 for the local motion analyzer 454 that uses the motion control parameters 452 to identify the pixels within an image that constitute a moving object within a scene, such as the flying insect or tree foliage. Note that by receiving the motion control parameters 452, the local motion analyzer 454 moving objects and their boundaries within the frame.

The registration module 438 determines the best parameters that can map each non-reference frame within the sliding window geometrically onto the reference frame in the same sliding window. For example, the registration module 438 receives the frame feature information 436, which includes the list of points that match from each of the frames in the N-frame sliding window, and can identify the frame feature information 436 list of points as the set of points where distortion is present. Some of the distortion present in the set of points is attributable to hand-shake camera motion, user intended camera motion, objects moving in the scene, or camera motion distortion such as complementary metal-oxide semiconductor (CMOS) Rolling Shutter Distortion. The registration module 438 can determine geometric warp parameters that can warp-align a frame onto the reference frame using frame feature information list 436. Using hand-shake variance information 442a, the registration module 438 can modify the warp parameters to remove hand-shake. The registration module 438 can further modify the warp parameters so that the output is stabilized corresponding to the stabilized path 442b. The registration module 438 can adjust warp parameters to remove CMOS rolling shutter distortion by generating distortion correcting geometric transformation parameters by utilizing motion distortion information 442c. The registration module 438 can perform all or subset of these steps. The registration module 438 can use any mechanism for describing warp parameters, such as affine matrices, projective transform matrices, or even locally varying generic mesh-warp parameters. In certain embodiments the mobile video HiFi Digital Zoom system 400 performs a HiFi registration process by using the camera stabilization information received from the video stabilization module 206 of the camera.

The HiFi interpolation module 456 compensates or otherwise corrects for geometric warp differences in each image. That is, for each image in the N-frame sliding window 424, the HiFi interpolation module 456 uses the affine matrices of the warp parameters 450 associated with that image to generate an unwarped and upscaled version of that image. That is, the output from the HiFi interpolation module 456 is an interpolated version of the sliding window 458 having N frames. The HiFi interpolation module 456 upscales the interpolated sliding window 458 by a zoom ratio of approximately 1.5× such that the interpolated sliding window 458 has a larger number of pixels than the N-frame sliding window 424. The HiFi interpolation module 456 includes an aliasing-retaining interpolation filter that comprises a polyphase implementation of digital upscale with a cut-off low-pass filter that is designed to extend well beyond the typical Nyquist frequency, and passes through a significant portion of the first alias. The aliasing-retaining interpolation filter deliberately does not filter out the aliasing components when performing interpolation. The retention of aliasing can be partial or complete, but retaining aliasing in the interpolated sliding window 458 until the blending process is intentional in filter design for the HiFi video zoom. The aliasing retention of the HiFi interpolation module 456, which is objectionable in a single-frame interpolation algorithm from a quality perspective, helps retain image features and resolution when multiple frames are blended. Blending multiple frames cancels the alias while preserving image features. In certain embodiments, the HiFi interpolation module 456 can use any one of standard methods for interpolation, such as bilinear interpolation, bicubic interpolation, polyphase interpolation, or other such methods. In certain embodiments, the HiFi interpolation module 456 applies an image interpolation algorithm that includes at least one of: aliasing retaining (AR) interpolation, above AR interpolation as spatially varying weights, or implementing sharpening as part of the interpolation.

The HiFi interpolation module 456 implements rotation transformation and sub-pixel shifts through bicubic weight generation based on coordinate transformation. Together with the interpolation filter described above, these rotation transformation and sub-pixel shifts constitute an affine transformation of the image. Splitting an affine transform into upscale and rotate/shift operations, implementing upscale through aliasing-retaining interpolation algorithm, and sharpening before rotation/shift operation are technical advantages of the HiFi interpolation module 456. The HiFi interpolation module 456 performs these technically advantageous operations with different characteristics, thereby optimizing output quality while reducing computational load.

In certain embodiments, the mobile video HiFi Digital Zoom system 400 includes a combination of all stages (rotation, shifts, upscaling and sharpening) into one set of locally adaptive weights. In certain embodiments, the mobile video HiFi Digital Zoom system 400 includes a processing block that is combination of aliasing-retaining interpolation, sharpening, rotation, and sub-pixel shifts algorithms that produce one set of locally adaptive weights. The locally adaptive weights are pre-computed, and applied based on pixel shifts from coordinate transformations. A Look-up-Table based method is used to fetch the local weights that are applied in the implementation.

The HiFi interpolation module 456 uses the locally adaptive weights for upscaling (interpolation), sharpening, rotation, and shifts (integer pixel or sub-pixel) frames. In certain embodiments, the HiFi interpolation module 456 performs upscaling, sharpening, rotation and shifts as separate operations. In other embodiments, the HiFi interpolation module 456 performs upscaling, sharpening, rotation and shifts as combined operations in another order. For example, the HiFi interpolation module 456 can include a combination of upscaling interpolation, sharpening, rotation, and shifts into one set of locally adaptive weights, and a combination of sub-sets into different sets of weights. In certain embodiments, the HiFi interpolation module 456 processes the N images in the N-frame sliding window 424 with a different set of locally adaptive weights depending on affine matrices of warp parameters 450 (i.e., the image registration parameters). In certain embodiments, the HiFi interpolation module 456 uses locally adaptive weights to implement a geometric transformation (affine or projective/perspective), with sharpening filter in between. In certain embodiments, the HiFi interpolation module 456 splits the geometric transformation to implement one aspect of interpolation through specialized interpolation kernels (such as an aliasing retaining upscaling kernel) and implement other aspects of the transformation through standard methods (for example bilinear or bicubic or other) or specialized methods.

The local motion analyzer 454 receives the exposure and color gain information 402 from the camera firmware 202 and receives an interpolated sliding window 458 including N interpolated frames from the HiFi interpolation module 456, in addition to receiving the motion control parameters 452. The local motion analyzer 454 applies a local motion handling algorithm to the interpolated sliding window 458 to determine which sub-parts of the images have moving objects. The local motion analyzer 454 generates a weight map or local motion map 460 that indicates which parts of an image have motion and which parts do not. The local motion analyzer 454 outputs local motion maps 460 to the PM align and blend processing block 448 and to the postprocessor 462 to indicate the location of each pixel that constitutes a moving object. The local motion analyzer 454 applies a local motion handling algorithm to analyze the local motion within each image in the interpolated sliding window 458. For example, the local motion analyzer 454 can determine the location of each pixel that constitutes the flying insect or the blowing tree foliage described in examples above. As another example, the local motion analyzer 454 can determine the location of each pixel that constitutes a person walking through a scene and distinguish the pixels of the person from the pixels of a stationary background, such as mountains. The local motion analyzer 454 implements an algorithm to determine the locally adaptive weights. The local motion analyzer 454 improves performance and accuracy by using up-sampled or down-sampled images for determining the local weights for local motion determination.

The PM align and blend processing block 448 uses local motion maps 460 to ensure that moving objects within the interpolated sliding window 458 are not blended together. As described more particularly below with reference to FIG. 5, the PM align and blend processing block 448 includes a PM align block 505 and a blend module 510. Inputs PM align and blend processing block 448 can be used by the PM align block 505, the blend module 510, or both.

The PM align block 505 applies a brightness and color correction algorithm to the blend control parameters 446 to generate adjusted blend control parameters 515. As described above, the video stream 300 includes changes in exposure, focus, and white balance because the 3A lock has an off status the during video capture. In applying the brightness and color correction algorithm, the PM align block 505 analyzes brightness differences and color differences between frames in an overlap region among the N frames of the interpolated sliding window 458, adjusts the brightness or color of N−1 frames in the sliding window to match as closely as possible to the reference frame, and rejects from blending each frame having a brightness/color difference that is too large, as indicated by a determination that the frame has a brightness difference that exceeds a predetermined threshold or has a color difference that exceeds a predetermined threshold by the scene analyzer 444. Additionally, the PM align block 505 corrects for moving focus in the sliding window by applying a combination of sharpness correction and blurred frame rejection. Accordingly, the adjusted blend control parameters 515 also includes parameters for correcting a moving focus. In certain embodiments, correction for moving focus may be performed by the pre-sharpening block 420, and as such, the pre-sharpening block 420 can receive focus correction information 705 from the scene analysis block 444, as shown in FIG. 7. PM align block 505 can apply a PM alignment algorithm to the sliding window according to a rate N times the capture frame rate to match brightness and color to that of a reference frame in the sliding window, In other embodiments, the PM align block 505 can apply a PM alignment algorithm to each frame of the sliding window according to the capture frame rate by adjusting brightness and color of the N frames of the sliding window to a time-varying target.

The blending module 510 receives the interpolated sliding window 458 and blends the N images into a single-blended image 464 according to the adjusted blend control parameters 515. Though the blending module 510 can receive all N images of the interpolated sliding window 458, the blend module 510 may exclude an image from the blend process based on the adjusted blend control parameters 515 received from the PM align block 505. The location of a pixel in the first image 302 of the interpolated sliding window 458 is the same location of that pixel in the other images in the interpolated sliding window 458. Accordingly, each location of a pixel can be either: (1) a high quality pixel selected from a reference frame 411 to be an unblended, or (2) a blend of up to N pixels from the same location in each of the N images in the interpolated sliding window 458. For each pixel location, the location motion maps 460 indicate whether a pixel will be blended or not. For each of the N images, the adjusted blend control parameters 515 indicate which images will be used for the blend process and a how much weight is assigned to pixels from each image. The single-blended image 464 can include blended pixels at certain locations and unblended pixels at other locations. The blending module 510 uses a weighted averaging operation to perform the blending operation. The multi-frame blending operation performs aliasing cancellation, defect pixel correction, and signal to noise ratio improvement (noise filtering). The local motion maps 460 include weights for the blending function that are determined by the local motion handling algorithm of the local motion analyzer 454. The blending module 510 uses statistical estimation techniques such as mean, median or other statistic for the purpose of blending multiple images. For example, the blending module 510 can compute the statistical mean (or average) on-the-fly and use the mean as a computationally efficient statistic for blending. The blending module 510 is not limited to uses the statistical average (for example, mean or median), but also can use a standard deviation, a minimum, or a maximum statistic as a computationally efficient statistic that can be computed on-the-fly, or any other statistic computed from the pixels coming from N frames.

The mobile video HiFi Digital Zoom system 400 includes a post-processor 462 and a second scaling 466, both included in the post-processing module 414.

The post-processor 462 includes a post-sharpener, a contrast analyzer, and a saturation estimator, each of which processes the single-blended image 464 to generate a sharpened single-blended image 468. The sharpening filter of the post-processing block 420 enhances image details in the interpolated image, and it helps improve sharpness in the overall output composite frame 250. A high-pass/band-pass filter is implemented as the sharpening filter. The cut-offs of the filter are visually optimized for a most pleasing output quality. In certain embodiments, the mobile video HiFi Digital Zoom system 400 enhances image fidelity by using a sharpening filter designed together with the aliasing retaining interpolation filter.

The second scaling block 466 receives a sharpened version of the single-blended image. The second scaling block 466 up-scales the sharpened single-blended image 468 by a remainder zoom ratio using a single-frame interpolation algorithm, such as a bicubic method or other interpolation method. The output from the second scaling block 466 is the composite image 250 at a resolution requested by the user, such as a 9× or 4× resolution of digital zoom. For example, if a user zooms in to a 9× zoom ratio to capture a video stream, then the HiFi Interpolation module 456 applies a 1.5× upscaling such that the sharpened single-blended image 468 needs to be further up-scaled by a remainder 6× zoom ratio for a 9× total zoom ratio. In this example, the total zoom ratio÷the first stage upscaling zoom ratio=the remainder zoom ratio. In certain embodiments, the second scaling block 466 upscales each frame in the sliding window by the remainder zoom ratio (i.e., second partial zoom ratio) by applying a single-frame interpolation algorithm to the single-blended image, such that the composite frame 250 is scaled to the user-selected zoom ratio (i.e., total zoom ratio).

According to this disclosure, the mobile video HiFi Digital Zoom system 400 implements a multi-stage digital zoom algorithm including a non-iterative multi-stage blending followed by a single-frame interpolation. The multi-stage digital zoom algorithm reduces the complexity of the overall algorithm because a substantial portion of the image quality improvement is realized at a smaller resolution. That is, the image processing occurs at the 1× or 1.5× resolution until the last stage, namely, the second scaling block 466. By comparison, image processing that occurs at the resolution requested by the user (for example, 4× or 9×) increases the processing complexity.

Although FIG. 4B illustrates one example mobile video HiFi Digital Zoom system 400, various changes may be made to FIG. 4. For example, the scene analyzer 444, registration module 438, and HiFi interpolation module 456 could receive the reference frame selection 411, and use the selected reference frame (for example, most recently capture frame) as the reference to which the remainder of frames within a sliding window are compared. As another example, the feature detection and tracking module 426 could receive the reference frame selection 411, and use the selected reference frame as the reference for calculating or estimating tracking relationships within a sliding window.

Figure 5:
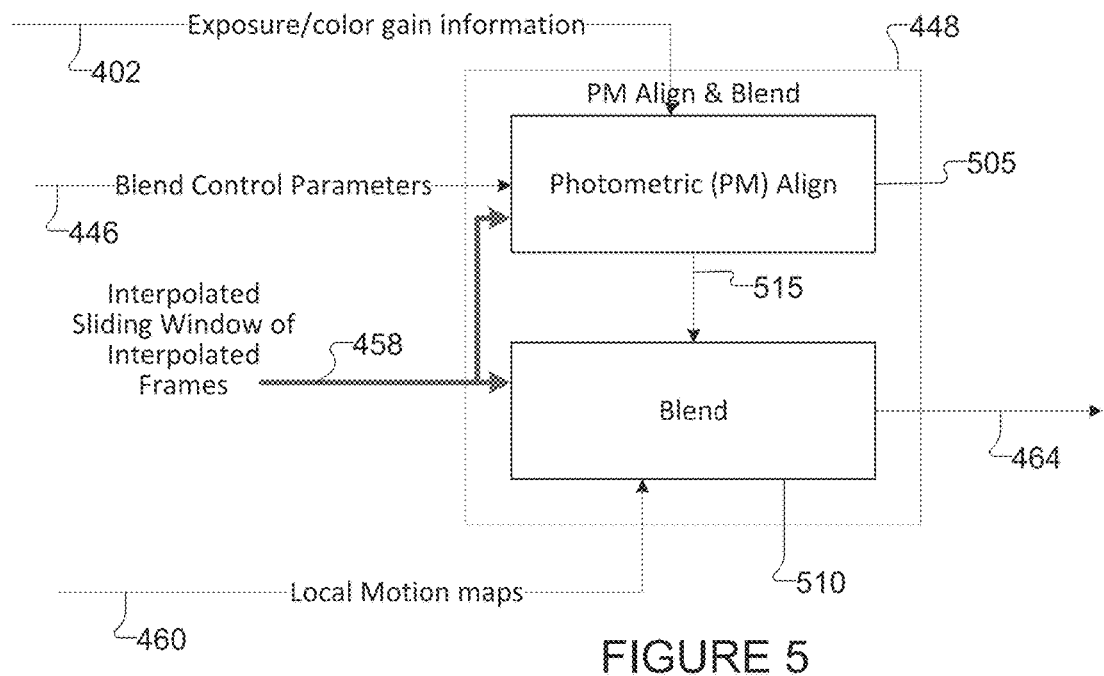
FIG. 5 illustrates example components within the photometric align and blend processing block of FIG. 4B.

FIG. 5 illustrates example components within the photometric align and blend processing block 448 of FIG. 4B. The PM align and blend processing block 448 includes a PM align block 505 and a blend module 510, operably coupled to each other such that the PM align block 505 can send adjusted blend control parameters 515 to the blend module 510. The blend module 510 generates the single-blended image 464 by blending the N interpolated frames within the interpolated sliding window 458 according to the weights of blending specified in the adjusted blend control parameters 515.

Although FIG. 5 illustrates one example PM align and blend processing block 448, various changes may be made to FIG. 5. For example, the functions of the PM align block 505 and a blend module 510 can be combined into a single processing block. In certain embodiments, the PM align block 505 may be omitted, in which case the mobile video HiFi Digital Zoom system 400 relying only on the scene analyzer 444 to reject frames with differences in colors and brightness.

FIG. 6 illustrates an example camera motion and scene analyzer 408 the system of FIG. 4B. The components 426, 428, 430, 432, 434 within the camera motion and scene analyzer 408 are described above with reference to FIG. 4B. In the example shown, the user intended motion estimator 432 estimates the camera motion based on the inertial measurements 265 received from the IMU 260.

Although FIG. 6 illustrates one example camera motion and scene analyzer 408, various changes may be made to FIG. 6. For example, the user intended motion estimator 432 can be combined with the camera motion stabilizer 434, such that the user intended motion estimator 432 provides the hand-shake camera motion information 442*a*. In certain embodiments, stabilization of hand-shake may not occur at all in camera motion and scene analyzer 408, but instead may occur externally in the camera ISP 210, or may occur at the output of the mobile video HiFi Digital Zoom system 400, or may not happen anywhere in the mobile video HiFi Digital Zoom system 400.

FIG. 7 illustrates an example components within the pre-processing block 406 of the system 400 of FIGS. 4A and 4B. The embodiment of the pre-processing block 406 shown in FIG. 7 is for illustration only. Other embodiments could be used without departing from the scope of the present disclosure. It should be understood that other embodiments may include more, less, or different components.

For example, the pre-processing block 406 could include a pre-scaler that upscales each frame in the sliding window by a second partial zoom ratio by applying the single-frame interpolation algorithm, wherein the user-selected zoom ratio equals a first partial zoom ratio multiplied by a second partial zoom ratio. In another example, a multi-frame pre-scaler could be intermediately coupled between the pre-processing block 406 and the HiFi interpolation module 456, such that the pre-processing block 406 provides the N-frame sliding window 424 to the multi-frame pre-scaler. The multi-frame pre-scaler upscales each frame in the sliding window by the second partial zoom ratio by applying a multi-frame interpolation algorithm to the sliding window 424.

Figure 8A:
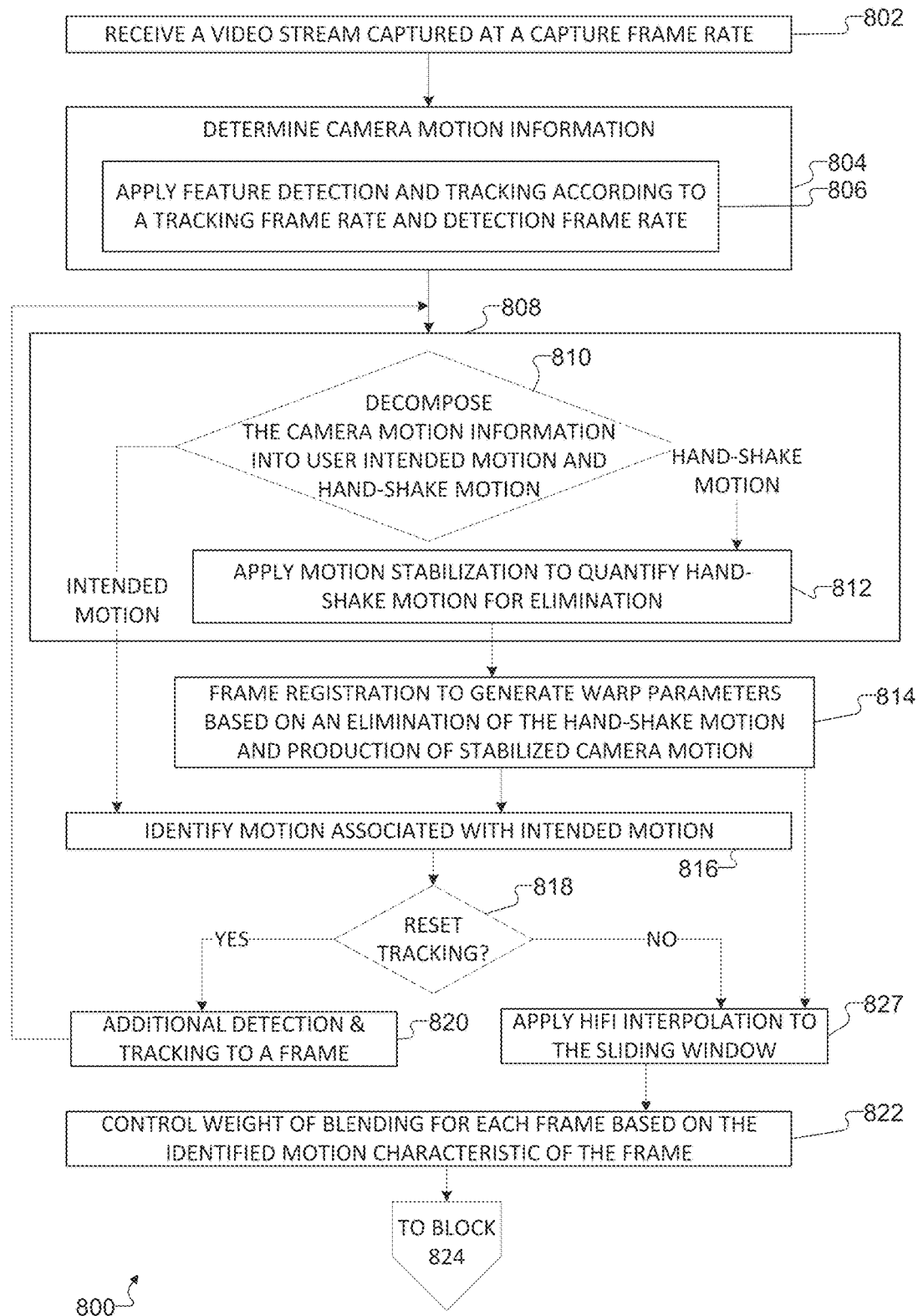
FIGS. 8A and 8B illustrate an example process for implementing the High Fidelity Zoom for a mobile video according to this disclosure.
Figure 8B:
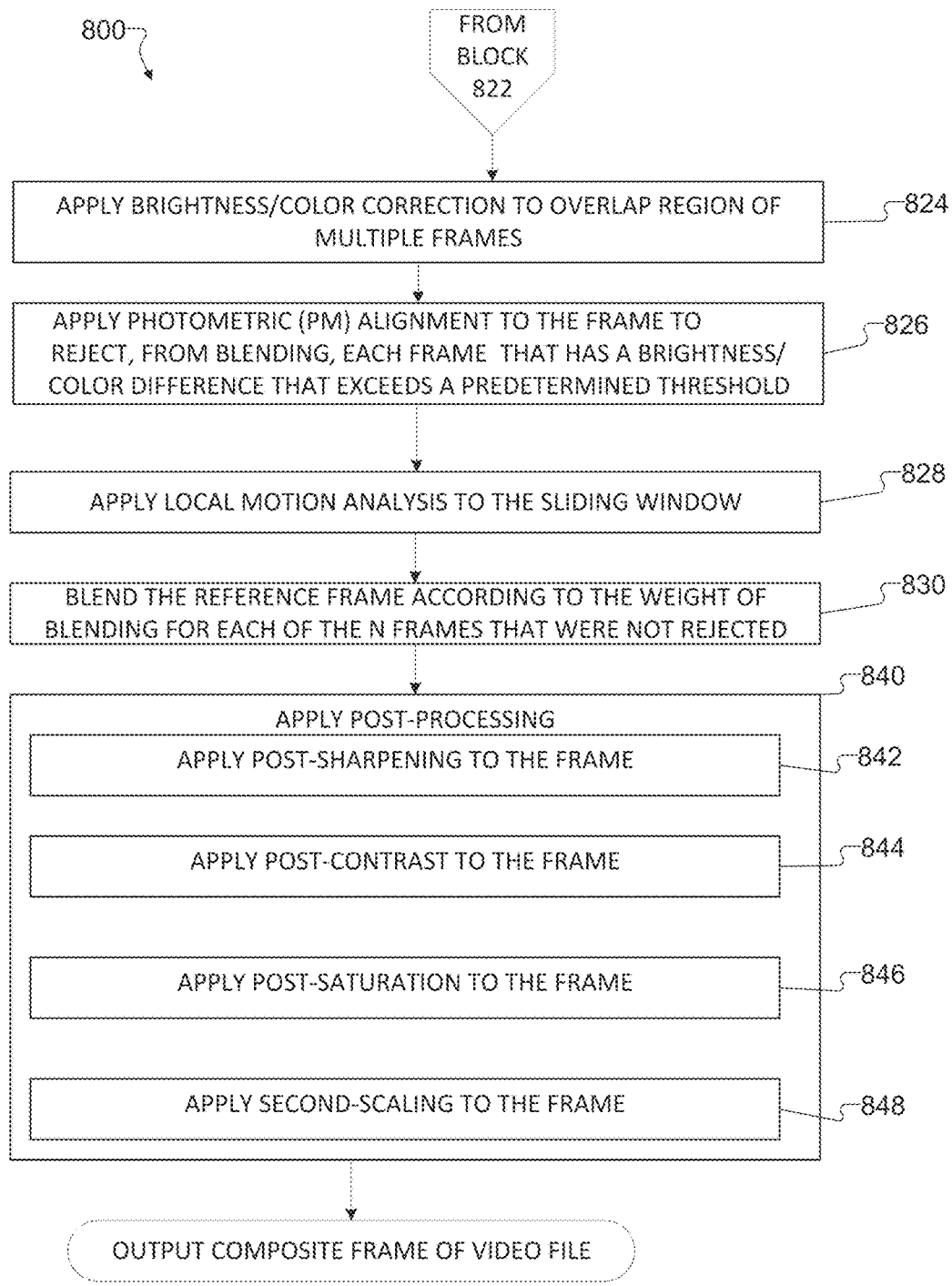

FIGS. 8A and 8B illustrate an example process 800 for implementing the High Fidelity Zoom for a mobile video according to this disclosure. For ease of explanation, the process 800 as if implemented by the processor 1045 of the UE 100. It should be understood that the process 800 can be implemented by any suitable video processing device.

In block 802, the processor 1045 receives a video stream 300 captured at a capture frame rate. For example, the camera 200 captures the video stream 300 at a capture frame rate of 30 fps, and consecutively outputs each frame 228 of the video stream 300 to the processor 1045.

In block 804, the processor 1045 determines camera motion information. In certain embodiments, determining the camera motion information includes receiving the camera motion information. For example, the camera motion information can include at least one of: inertial measurements 265, or the set of points registered by the camera video stabilization module 206. In certain embodiments, determining the camera motion information includes applying digital methods. For example, the camera motion information can include frame feature information 436. In other embodiments, a combination of external methods (e.g. video stabilization module 206), inertial methods (e.g., based on inertial measurements 265) and digital methods (e.g., based on frame feature information 436) may be utilized.

Also, determining the camera motion information can include block 806, wherein the processor 1045 applies feature detection and tracking to the video stream 300 according to a tracking frame rate and detection frame rate that are each at most the capture frame rate. For example, the processor can apply detection to the video stream 300 according to a detection frame rate that is 15 fps and apply tracking to the video stream 300 according to a tracking frame rate that is 30 fps. In this example, the detection frame rate is half the capture frame rate, and the tracking frame rate is the equal to the capture frame rate. In certain embodiments, a maximum detection frame rate is 30 fps, and a maximum track frame rate is N times the maximum detection frame rate.

In block 808, the processor 1045 analyzes the camera motion information. In block 810, the processor 1045 decomposes the camera motion information into intended camera motion and hand-shake camera motion based on the camera motion information. For example, the processor 1045 performs operations of the user-intended motion estimator 432 to generate the user intended motion information 440. In block 812, the processor 1045 applies motion stabilization to quantify hand-shake camera motion for elimination from the video stream. For example, the processor performs operations of the camera motion stabilizer 434 to generate the hand-shake camera motion information 442*a* indicating an amount and direction of distortion correction to be applied to a frame to remove distortion attributable to the hand-shake camera motion. Camera motion stabilizer 434 also outputs a stabilized path 442*b* indicating to frame registration module 438 the camera motion path to be rendered in the output. Camera motion stabilizer 434 also outputs CMOS Electronic Rolling Shutter distortion information so that the frame registration module 438 can determine the amount of geometric warping that needs to be applied in order to correct it.

In block 814, the processor 1045 performs frame registration to generate warp parameters 450 (such as, but not limited to affine matrices) based on an elimination of the hand-shake motion, production of stabilized camera motion path in output video, and removal of CMOS Electronic Rolling Shutter distortion. That is, the processor 1045 generates a set of affine matrices of warp parameters 450 indicating the amount of warp of the frame needed to perform all three of these corrections. For example, the processor 1045 performs operations of the registration module 438, using the hand-shake motion information 442*a* to remove distortion attributable to hand-shake camera motion from the set of points where distortion is present (e.g., the frame feature information 436 list of points), camera stabilization path information 442*b* to output a visually pleasing smoothly moving video, and CMOS Electronic Rolling Shutter distortion information 442*c* to remove of CMOS Electronic Rolling Shutter distortion. In certain embodiments, the frame registration module 438 may generate combined warp parameters to accomplish the three in an efficient manner. In other embodiments, the frame registration module 438 may generate warp parameters to accomplish a subset of the three.

In block 816, the processor 1045 identifies motion associated with the intended camera motion. For example, the processor 1045 performs operations of the user-intended motion estimator 432 to determine the motion characteristics of the frame. For example, the motion characteristics can be obtained from comparing differences between a reference frame an each other non-reference frame in the corresponding sliding window. In certain embodiments, motion characteristics may also be judged by processing the estimation within frame feature information 436 to determine if tracking performance was below a certain pre-determined reliability threshold due to excessive motion, excessive brightness/color changes, or noise.

In block 818, the processor 1045 determines whether to reset the tracking based on the determined motion characteristics of the frame. For example, the processor 1045 can reset the feature detection and tracking module 426 based on a determination that the amount of motion associated with a frame exceeds a feature tracking reliability threshold. As another example, the processor 1045 can reset the feature detection and tracking module 426 based on a determination that a number of feature points that are lost exceeds a feature point loss threshold. Upon a determination to reset the tracking, the process 800 proceeds to block 820. Upon a determination to not reset the tracking, the process 800 proceeds to block 827.

In block 827, the processor 1045 applies a HiFi Interpolation to the sliding window. For example, the processor 1045 receives the pre-processed versions of the N-frames within the sliding window 424, and generates an interpolated sliding window 458 by applying a HiFi Interpolation to remove warp from each of the N pre-processed frames within the sliding window 424 according to the affine matrices of warp parameters 450. As shown in HiFi interpolation module 456, the application of the HiFi Interpolation can remove distortion attributable to CMOS ERS distortion, remove hand-shake camera motion, and generate a visually pleasing smoothly moving video.

In block 820, the processor 1045 performs additional frame feature detection and tracking to the frame having an erroneous estimated tracking relationship value or having too many lost feature points. For example, the processor 1045 performs the operation of the feature detection and tracking module 426 to perform additional true calculations of detection and tracking associated with the frame.

In block 822, the processor 1045 controls the weight of blending for each frame of the video based on the identified motion characteristic of the frame. For example, the processor 1045 rejects each frame that exhibits too much motion, such as when the frame is different from another frame in the sliding window by an amount that exceeds a frame difference threshold. The processor 1045 can also reject a frame if the frame exhibits too much blur due to motion, or lack of focus.

In block 824, the processor 1045 applies a global brightness correction or global color correction to an overlap region of multiple frames. For example, the processor 1045 performs operations of the PM align block 505 to correct color differences and correct brightness differences by adjusting blend control parameters 446.

In block 826, the processor 1045 applies a PM alignment to the frame using the corresponding N-frame sliding window. For example, the processor 1045 compares each frame to other frames in the sliding window, and rejects each frame that has a brightness difference that exceeds a predetermined threshold or has a color difference that exceeds a predetermined threshold. That is, a rejected frame exhibiting too much brightness/color difference will have a zero weight of blending or will be excluded from a blending process.

In block 828, the processor 1045 applies a local motion analysis to the sliding window. For example, the processor 1045 determines which sub-parts of the N-interpolated frames within the interpolated sliding window 458 have moving objects, and the determination is based on the exposure and color gain information 402 and the motion control parameters 452 received.

In block 830, the processor 1045 blends the N-frames according to the weight of blending. That is, the processor blends each non-rejected frame of the sliding window according to the weight of blending assigned to each frame. As described above, the processor 1045 excludes rejected frames from the blending process.

In block 840, the processor 1045 applies post-processing to the single-blended frame 464. For example, the processor 1045 applies a post sharpening to the single-blended frame 464 (in block 842), followed by applying a post-contrast analysis to the sharpened single-blended frame (in block 844), followed by a post-saturation analysis to the contrasted and sharpened single-blended frame. In block 848, the processor 1045 generates a composite frame 250 by applying a second-scaling to the sharpened single-blended image 468. In block 850, the processor outputs the composite frame 250 to a video file, which can be stored in a video gallery application of the UE 100.

Although FIGS. 8A and 8B illustrate one example process 800 for implementing the High Fidelity Zoom for a mobile video, various changes may be made to FIGS. 8A and 8B. For example, while shown as a series of steps, various steps in FIGS. 8A and 8B could overlap, occur in parallel, occur in a different order, or occur any number of times. As a more particular example, the architecture of the processor 1045 provides a low-power implementation more complex than simply putting the algorithm in silicon. The processor 1045 can combine frame-based processing, tile-based processing, and slice-based processing that achieves several optimizations including: latency reduction and a low system memory bandwidth consumption.

In order to achieve end-to-end latency reduction, the processor 1045 implements slice-based processing, which includes dividing each frame of the sliding window into M slices according to horizontal and vertical dimensions of each frame; providing a pipeline components of a video stream 300 to a pre-processing module 406 and a camera motion and scene analyzer 408 at the same time; and providing the pipeline to a post-processing module 414 at a subsequent time that is prior to providing the Mth of the M slices of the frame. The a pipeline starts with an $i^{th}$ of the M slices from each frame of the video stream 300, followed by the $(i+1)^{th}$ slice, and so forth to the $M^{th}$ slice.

In order to achieve additional end-to-end latency reduction and/or low system memory bandwidth consumption, the processor 1045 implements tile-based processing. The tile-based processing includes: dividing each of the M slices from each of the N frames of the sliding window into L tiles. A pipeline of components of the video stream 300 can start with N $j^{th}$ tiles (e.g., j=1, 2, . . . L). The N jth tiles include a jth of the L tiles from each ith slice from N frames of the sliding window. That is, the N jth tiles at the start of the pipeline includes the set {F1Si=1Tj=1, F2S1T1, F3S1T1, F4S1T1, FN=5S1T1}, followed by the N $(j+1)^{th}$ tiles from each $i^{th}$ slice from N frames of the sliding window including the set {F1Si=1Tj=2, F2S1T2, F3S1T2, F4S1T2, FN=5S1T2}, and so forth until the tile index j equals the number L of tiles, then incrementing the slice index i until the slice index equals the number M of slices. The pipeline for a single sliding window having N=5 frames ends with the set of tiles {F1Si=MTj=L, F2SMTL, F3SMTL, F4SMTL, FN=5SMTL}. The tile-based processing includes: sequentially providing a pipeline of components of the video stream 300 to a pre-processing module in order to generate N pre-processed jth tiles, a High Fidelity Interpolation module in order to generate an interpolated jth tile of an interpolated frame by removing the hand-shake camera motion, a blending module in order to generate an jth single-blended tile according to the weight of blending of each frame in the sliding window, and a post-processing module in order to generate a jth composite tile having a user-selected digital zoom ratio. The tile-based processing further includes: for an (i+1)th slice or first slice of a next sliding window, repeating the sequentially providing, wherein the post-processing module completes generation of an Lth composite tile of the Mth slice of the frame before the pre-processing module completes generation of N pre-processed Lth tiles of the Mth slice of a next frame.

Figure 9:
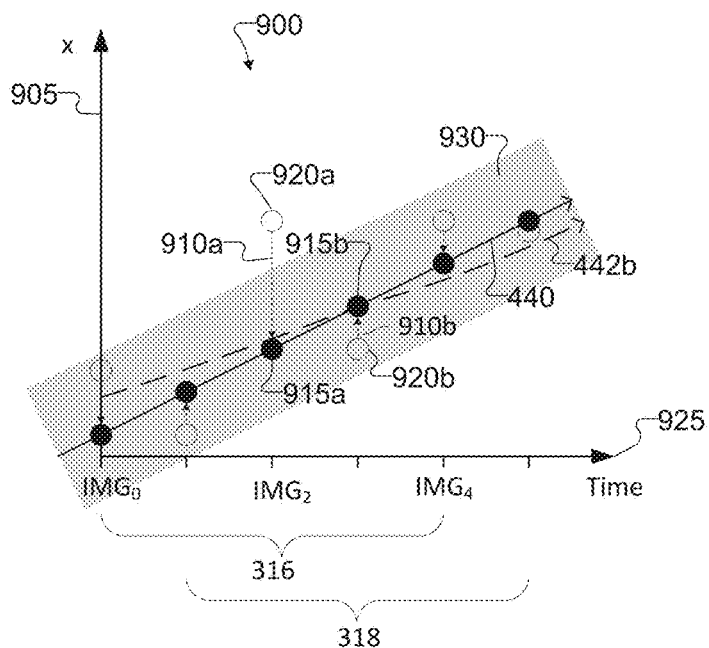
FIG. 9 illustrates a graph for explaining decomposition of camera motion information into intended camera motion and hand-shake camera motion according to this disclosure.

FIG. 9 illustrates a graph 900 for explaining decomposition of camera motion information into intended camera motion and hand-shake camera motion according to this disclosure. The graph 900 includes a vertical axis 905 representing displacement of the camera 200 from an initial position, and a horizontal axis 925 representing time from an initial frame capture.

The graph 900 includes a series of plots of actual positions 920*a* (namely, actual location and actual orientation) at which each raw image of the video stream 300 is captured. For example, the third frame 306 (IMG2) was captured at the actual position 920*a*, and the fourth frame 308 (IMG3) was captured at the actual position 920*b*. As an example, the user intended motion estimator 432 can determine the actual positions 920*a*-920*b* using camera motion information. For each sliding window, the user intended motion estimator 432 determines user intended camera motion information 440 as a function representing a relationship between the actual camera positions for the N-frames within the sliding window. In the example shown, user intended camera motion information 440 is shown as a line representing the function of the relationship between the actual camera positions for the first sliding window 316 and the function of the relationship between the actual camera positions for the second sliding window 318.

The graph 900 includes a series of plots of intended positions 915*a*-915*b* (namely, intended location and intended orientation) at which the user-intended to capture each frame. Each intended position 915*a*-915*b* can be determined as the point of intersection of the user intended camera motion information 440 line and the time at which a raw frame was a captured. For example, the user intended motion estimator 432 estimates that user intended to capture the third frame 306 (IMG2) at the intended position 915*a*, and the fourth frame 308 (IMG3) at the intended position 915*b*. The user intended motion estimator 432 can provide the user intended camera motion information 440 function to the scene analyzer 444 and to the camera motion stabilizer 434.

The graph 900 includes 930 a frame difference threshold 930, shown as a shaded area. The frame difference threshold 930 includes a specified variance from the user intended camera motion information 440 line, and is shown as a shaded area. The frame difference threshold 930 represents a condition for which frames will be blended together and which frames will be rejected from the blend process. As an example, the variance 910*a* exceeds the frame difference threshold 930, as the actual position 920 is plotted outside the shaded area of tolerable variance. A frame difference that exceeds the frame difference threshold 930 can indicate a frame that exhibits too great of a motion blur characteristic. As another example, the variance 910*b* of the fourth frame 308 (IMG3) does not exceed the frame difference threshold. In the first sliding window, four of the N=5 frames will be blended together. That is, fifth frame (IMG4) can be the reference frame that blends with the first (IMG0), second (IMG1), and fourth frames (IMG3). In the second sliding window, the sixth frame (IMG5) can be the reference frame that blends with the second (IMG1), fourth (IMG3), and fifth frames (IMG4).

The camera motion stabilizer 434 calculate or otherwise determine a variance 910*a*-910*b* between each actual position 920*a*-920*b* and each intended position 915*a*-915*b*. Each variance 910*a*-910*b* includes a magnitude and a direction, which can be represented as a matrix and sent to the registration module 438 as the hand-shake camera motion information 442*a*. The graph 900 includes a stabilized camera path 442*b*, which can be the same as or different from the user intended camera motion information 440 line.

Figure 10:
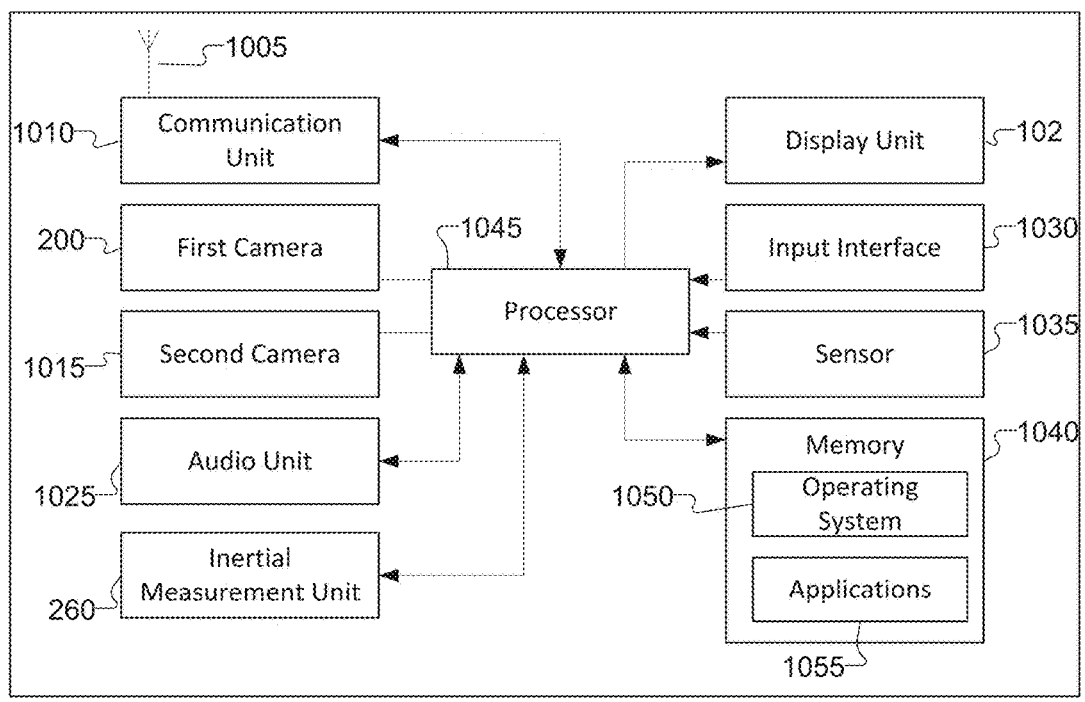
FIG. 10 illustrates a block diagram of a configuration of the user equipment of FIG. 1 according to this disclosure.

FIG. 10 illustrates a block diagram of a configuration of the user equipment of FIG. 1 according to this disclosure. The embodiment of the UE 100 shown in FIG. 10 is for illustration only. Other embodiments could be used without departing from the scope of the present disclosure. UEs come in a wide variety of configurations, and FIG. 10 does not limit the scope of this disclosure to any particular implementation of a UE. For example, the UE 100 can be a mobile phone including a smart phone, MP3 terminal, tablet PC, and various digital equipment having a camera (e.g. embedded video camera).

The UE 100 includes an antenna 1005, a communication unit 1010, a first camera 1015, a second camera 1015, an audio unit 1025, IMU 260, a display unit 102, an input interface 1030, sensor 1035, memory 1040, and processor 1045.

The communication unit 1010 performs a communication function with a base station or internet server. Further, the communication unit 1010 includes a modulator and a demodulator. The modulator transmits a transmitting signal to the transmitter by modulating the signal, and the demodulator demodulates a signal received through the receiver. Here, the modulator and demodulator can be a Long Term Evolution (LTE), Wideband Code Division Multiple Access (WCDMA), Global System for Mobile Communications (GSM), Wireless Fidelity (WIFI), Wireless Broadband (WiBro), Near Field Communication (NFC), or Bluetooth (Bluetooth). In the embodiments of the present disclosure, the communication unit 1010 is configured with LTE, WIFI, and Bluetooth devices.

The first camera 200 is a camera disposed at the rear side of the portable terminal, and can capture a high resolution video. The second camera 1015 is a camera disposed at the front side of the portable terminal, and can digital photographs or digital video.

The audio unit 1025 includes a microphone and a speaker. An audio unit 1025 processes voice signals generated in a communication mode and processes an audio signal generated in a videographing mode of the camera.

A display unit 102 displays information of an executing application under the control of the processor 1045. The display unit 102 may be a liquid crystal display (LCD), OLED, or other display capable of rendering text and/or at least limited graphics, such as from web sites. The input interface 1030 is provided with a capacitive type or resistive type, and outputs location information of user's touch (finger touch) to the processor 1045. Further, the input interface 1030 can include an EMR sensor pad, and detects a pen touch input to transmit to the processor 1045. Here, the display unit 102 and input interface 1030 can be integrated into one unit. The input interface 1030 can include a keypad that the operator of the UE 100 can use a keypad to enter data into the UE 100.

A sensor 1035 can include various sensors for detecting movement of the UE 100. The sensor 1035 can be configured with an acceleration sensor, geomagnetic sensor, and/or location detection sensor. The sensor 1035 can include the IMU 260, and can implement the functions of the IMU.

The memory 1040 includes an operating system (OS) program 1050 and one or more applications 1055, such as a video camera application. The memory 1040 is coupled to the processor 1045. Part of the memory 1040 could include a random access memory (RAM), and another part of the memory 1040 could include a Flash memory or other read-only memory (ROM). The memory 1040 has a program memory storing the operating system 1050 of the UE 100 and the video camera application 1055 according to embodiments of the present disclosure, and a data memory storing tables for the operation of the UE and data generated while executing a program.

The video camera application 1055 provides a specialized methodology for generating high fidelity zoom for mobile video that produces a video stream with improved signal-to-noise ratio, lower aliasing, improved rendering of curvy and angled objects, and improved clarity. The video camera application 1055 decomposes camera motion into user handshake camera motion (small un-intended micro-movements of the hand) and user intended camera motion. The video camera application 1055 uses computational methods to take advantage of the additional information contained in these images coming from slightly different perspectives and produces high fidelity zoom video streams. The video camera application 1055 uses a combination of multi-frame high fidelity interpolation and regular non-HiFi digital zoom in a two-stage fashion to reduce complexity or extend zoom ranges.

The processor 1045 can include one or more processors or other processing devices and execute the OS program 1050 stored in the memory 1040 in order to control the overall operation of the UE 100. In some embodiments, the processor 1045 includes at least one microprocessor or microcontroller. The processor 1045 controls the general operation of the UE 100, and controls a function of generating high fidelity zoom for mobile video according to the disclosure. That is, the processor 1045 is also capable of executing other processes and programs stored in the memory 1040, such as operations for generating high fidelity zoom for mobile video. The processor 1045 can move data into or out of the memory 1040 as required by an executing process. In some embodiments, the processor 1045 is configured to execute the applications 1055 based on the OS program 1050 or in response to signals received from a base station or an operator. The processor 1045 is also coupled to the display unit 102. In the UE 100, the processor 1045 obtains a still image or video frame by controlling the first camera 200 and/or second camera 1015. The processor 1045 controls the display unit 102 to display the image selected in an edit mode and to display soft buttons to select a HiFi video mode for the camera 200.

Although FIG. 10 illustrates one example of UE 100, various changes may be made to FIG. 10. For example, various components in FIG. 10 could be combined, further subdivided, or omitted and additional components could be added according to particular needs. As a particular example, the processor 1045 could be divided into multiple processors, such as one or more central processing units (CPUs) and one or more graphics processing units (GPUs). Also, while FIG. 10 illustrates the UE 100 configured as a mobile telephone or smartphone, UEs could be configured to operate as other types of mobile or stationary devices.

Figures 11, 12A, 12B:
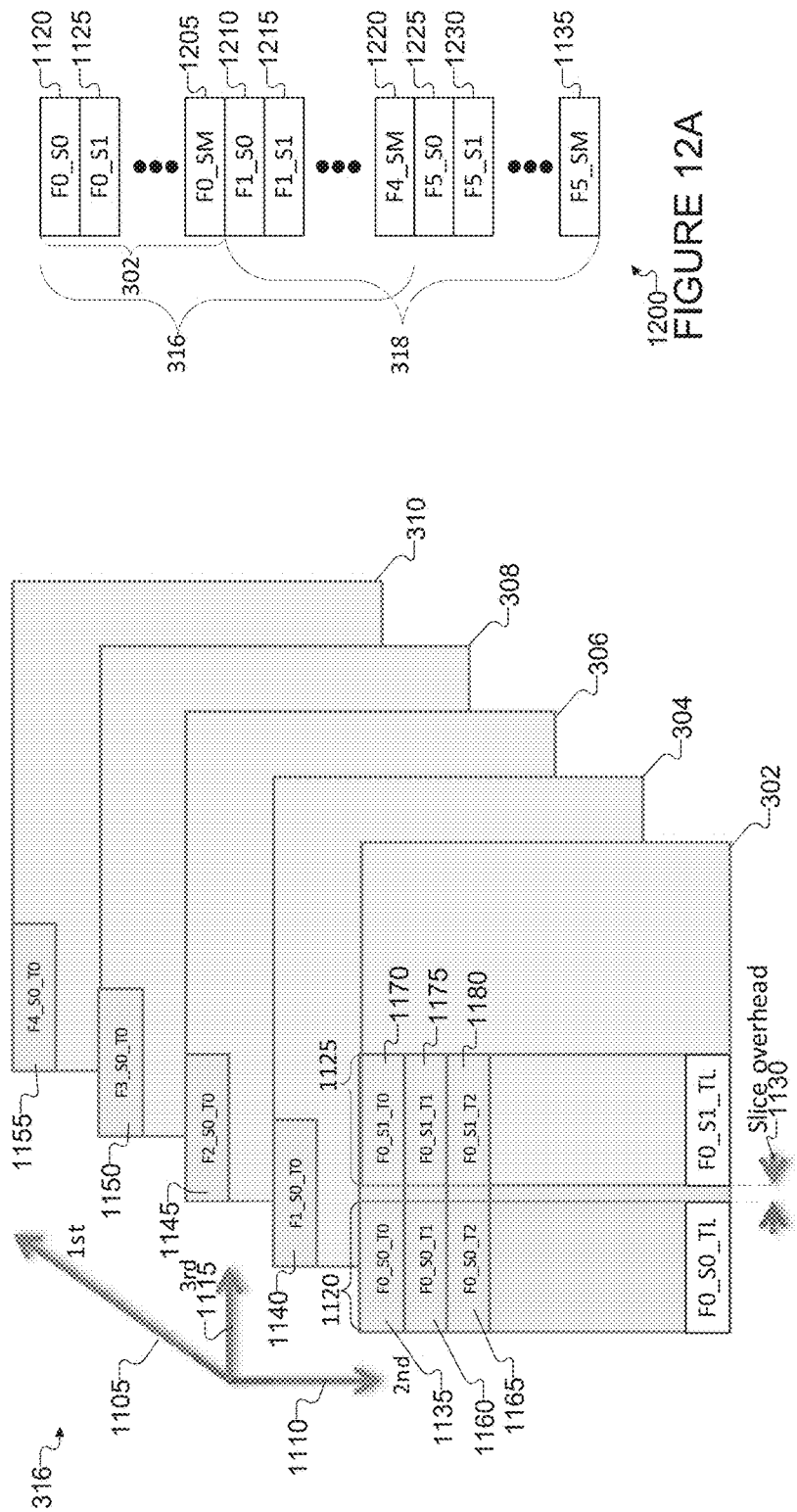
FIG. 11 illustrates an example sliding window of frames divided into slices and tiles according to a slice-based processing and a tile-based processing according to this disclosure.
FIG. 12A illustrates an example sliced-based processing pipeline of components of a video stream according this disclosure.
FIG. 12B illustrates an example tile-based processing pipeline of components of a video stream according this disclosure.

FIG. 11 illustrates an example sliding window 316 of frames divided into slices and tiles according to a slice-based processing and a tile-based processing according to this disclosure. As an example, slice-based processing and tile-based processing of the sliding window 316 will be described, however subsequent sliding windows 318, 320 can be divided similarly. The sliding window 316 includes N=5 frames 302, 304, 306, 308, 311, which the span a first dimension 1105, namely a time dimension. According to slice-based processing, each frame is divided into a number M of slices 1120, 1125 according to a vertical dimension 1110 and a horizontal dimension 1115 of each frame. That is, the first frame 302 includes a first slice 1120, a second slice 1125, and so forth to an Mth slice. Similarly, each of the second through fifth frames includes a first slice 1120, a second slice 1125, and so forth to an $M^{th}$ slice. Each frame can include slice overhead 1130 between consecutive slices 1120 and 1125.

According to tile-based processing, each slice 1120, 1125 is divided into a number of L of tiles according to the vertical dimension 1110 and the horizontal dimension 1115 of each frame. As shown, F0_S0_T0 represents the first frame 302, namely the $0^{th}$ frame (F0), the first slice 1120, namely the $0^{th}$ slice (S0), and the first tile 1135, namely, the $0^{th}$ tile (T0). Each slice can include a same number of tiles. Each of the first through fifth frames 302, 304, 306, 308, 311 includes a first tile 1135, 1140 1145, 1150, 1155, respectively in its first slice 1120. The first slice 1120 includes a second tile 1160 (F0_S0_T1), a third tile 1165 (F0_S0_T2), and so forth through an $L^{th}$ tile (F0_S0_TL). Similarly, the second slice 1125 includes a first, second, and third tile 1170, 1175, 1180, and so forth through an $L^{th}$ tile (F0_S1_TL). The number of slices and/or the number of tiles can be pre-determined, or calculated based on the dimensions of the frames, the aspect ratio of the frames, and/or hardware capabilities of the UE 110.

FIG. 12A illustrates an example sliced-based processing pipeline 1200 of components of a video stream according this disclosure. The sliced-based processing pipeline 1200 starts with an $i^{th}$ of the M slices from each frame of the video stream 300, followed by the $(i+1)^{th}$ slice, and so forth to the $M_{th}$ slice. That is, the sliced-based processing 1200 starts with the first slice 1120 (F0_S0) of the first frame 302 of the first sliding window 316, followed by the second slice 1125 (F0_S1) of the of the first frame 302 of the first sliding window 316, and so forth to the $M^{th}$ slice 1205 of the first frame. Following the M slices of the first frame, the sliced-based processing 1200 includes the first slice 1210 (F1_S0), second slice 1215 (F1_S1), and so forth to the $M^{th}$ slice (F1_SM) of the second frame, and so forth to the $M^{th}$ slice 1220 (F4_SM) of the $N^{th}$ frame of the first sliding window 316. Following the $N^{th}$ slice of a previous sliding window, the sliced-based processing 1200 includes the first slice 1225 (F5_S0), second slice 1230 (F5_S1), and so forth to the $M^{th}$ slice 1235 (F5_SM) of the $N^{th}$ frame of the subsequent sliding window 318.

FIG. 12B illustrates an example tile-based processing pipeline 1201 of components of a video stream according this disclosure. The tile-based processing pipeline 1201 starts with a set of tiles 1202 including one tile from each of the N frames in the sliding window 316. Each tile is referred to by a tile index j, and each slice is referred to by a slice index i. Accordingly, the tile-based processing pipeline 1201 starts with a first set 1202 of N $j^{th}$ tiles of the $i^{th}$ slice of the sliding window 316, followed by a second set 1204 of tiles. The first set 1202 includes the first tiles 1135, 1140, 1145, 1150, and 1155 of the first slice 1120 of the first through fifth frames 302, 204, 306, 308, and 310. The second set 1204 of tiles includes the second tiles {(F0_S0_T1), (F1_S0_T1), (F2_S0_T1), (F3_S0_T1), (F4_S0_T1)} of the first slice 1120 of the first through fifth frames 302, 204, 306, 308, and 310. The second set 1204 of tiles is followed by a subsequent indexed tile from the first slice 1120 of each frame of the sliding window 316, and so forth through the $L^{th}$ set of tiles {(F0_S0_TL), (F1_S0_TL), (F2_S0_TL), (F3_S0_TL), (F4_S0_TL)} from the first slice 1120. Next, the tile-based processing pipeline 1201 includes a first set of tiles {(F0_S1_T1), (F1_S1_T1), (F2_S1_T1), (F3_S1_T1), (F4_S1_T1)} from a second slice 1125 of each frame of the sliding window 316, and so forth through the $L^{th}$ set of tiles from the second slice 1125, and so fourth through the $L^{th}$ set of tiles of the $M^{th}$ slice of the sliding window 316, which is the last set of tiles of sliding window 316. The last set of tiles of sliding window 316 includes the set of tiles {(F0_SM_TL), (F1_SM_TL), (F2_SM_TL), (F3_SM_TL), (F4_SM_TL)} includes the last tile 1206.

According to the tile-based processing pipeline 1201, the memory bandwidth of a processor chip can include a full set of N tiles, enabling N frames to be processed in a multi-frame processing using the memory bandwidth of a processor chip. The memory bandwidth of a processor chip can be much smaller than the memory bandwidth of a storage device. By implementing a multi-frame processing using the memory bandwidth of a processor chip, consumption of memory bandwidth of the storage device of the UE can be reduced.

Figure 13:
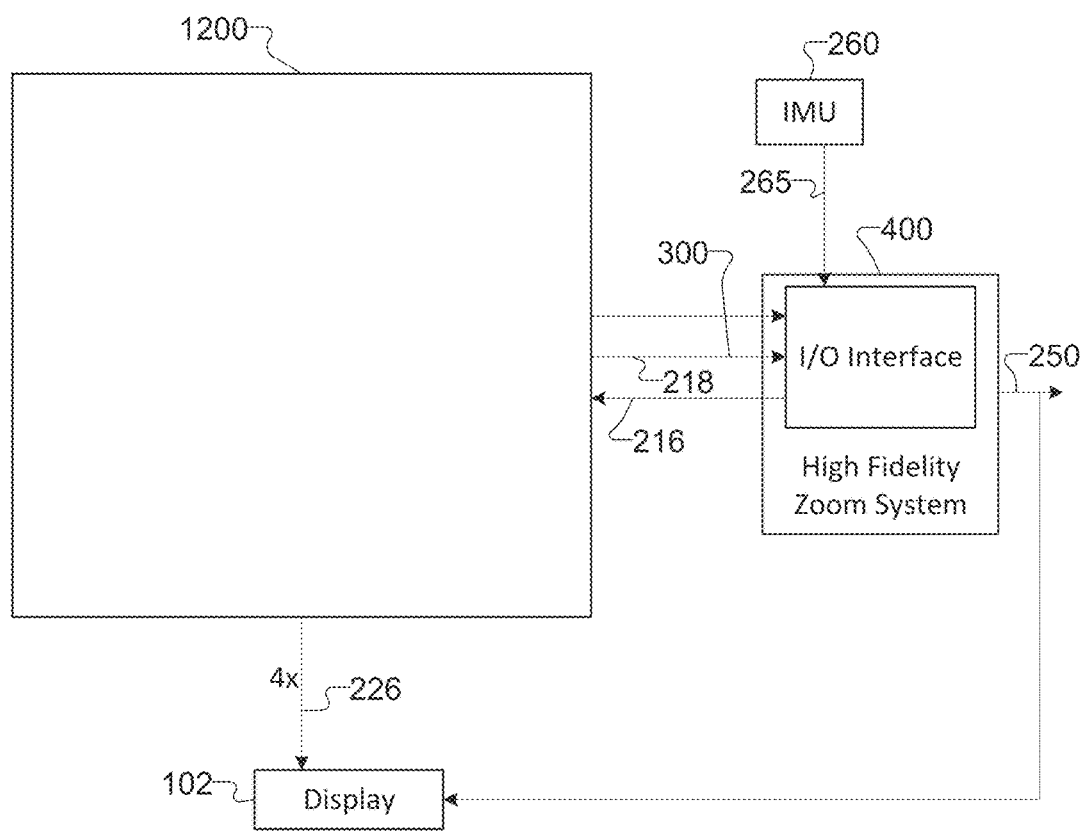
FIG. 13 illustrates an example block diagram of a video playback device within the user equipment of FIG. 1 for implementing the High Fidelity Zoom for a mobile video according to this disclosure.

FIG. 13 illustrates an example block diagram of a video playback device within the user equipment of FIG. 1 for implementing the High Fidelity Zoom for a mobile video according to this disclosure.

The video playback device 122 is connected to the mobile video HiFi Digital Zoom system 400 in order to operate in the HiFi video mode, and to receive control signals 216 from, and send control signals 218 and a video stream 300 to the mobile video HiFi Digital Zoom system 400. The video playback device 122 includes a video player program or application that controls operations of the video playback device 122, such as to provide the video frames of the video stream 300 to the mobile video HiFi Digital Zoom system 400. Execution of the video playback application, by processing circuitry (e.g., the processor 1045), can including using the output video stream to reduce end-to-end latency. The video playback device 122 and determine a user-selected zoom ratio, and provide a rescaled image 226 to the display 102, and in order to do so, the video playback device 122 controls the display 102 to display the composite frame 250, which has the user-selected digital zoom ratio.

Digital zoom techniques for large zoom ratios produce a technical problem of amplified and enlarged artifacts and noise in the resulting digitally zoomed image. During capture of video frames, camera motion can be include user intended motion (e.g., a combination of panning in two dimensions while walking in a third dimension) in addition to unintended motions (for example, hand-shake). That is, an assumption that camera motion is only caused by a small difference in position of the camera due to hand-shake is inapplicable to video frames that may not include a same scene. This disclosure provides a technical solution to decompose camera motion information into "user intended camera motion" and "hand-shake camera motion." An assumption that a same scene is captured in the frames to be blended together is inapplicable because the user intended motion causes the camera to capture different scenes in the video frames. This disclosure provides a technical solution to identify a motion characteristic associating with moving objects in a scene. During video capture, changes in exposure, focus, and white balance among frames to-be blended presents a technical problem to avoid a degraded composite image that results from a blending operation of frames that have too large of a difference in exposure, focus, or white balance. This disclosure provides a technical solution to control a weight of blending of a frame based on differences relative to another frame(s) in the same sliding window, for example by applying photometric (PM) alignment and blend techniques, and multi-frame feature detection and tracking improved beyond a naïve implementation. This disclosure provides technical solutions to reduce latency and to reduce memory bandwidth requirements.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:
1. An apparatus comprising:
   a camera configured to capture a video stream at a capture frame rate; and
   a processing circuitry configured to, in order to generate a composite image:
      identify, in a frame of the video stream captured by the camera, a motion characteristic associated with moving objects in a scene while the camera captured a sliding window of the video stream; and
      for a plurality of frames in the sliding window, control a weight of blending of the frame based on the identified motion characteristic to enable the composite image to be generated according to the controlled weights of blending of the plurality of frames in the sliding window;
   wherein the processing circuitry is further configured to, in order to generate the composite image having a user-selected digital zoom ratio:
      include at least two frames of the video stream in the sliding window that contains a number N of consecutive frames of the video stream,
      determine camera motion information associated with motion of the camera while the camera captured the video stream, and
      for each frame in one or more frames of the video stream:
         analyze an amount of warp of the frame based on the camera motion information, and
         generate a set of warp parameters indicating the amount of warp of the frame;
      for frames in the sliding window that includes the frame:

generate a warp interpolated frame by applying the warp parameters and an image interpolation technique to the frame, wherein the processing circuitry is further configured to:
generate the composite image by: blending the warp interpolated frames corresponding to the sliding window into a single-blended frame according to the controlled weight of blending of each frame in the sliding window, and produce an output video stream including the composite image generated from the sliding window and a subsequent composite image generated from a subsequent sliding window that includes a subsequent N consecutive frames of the video stream.

2. The apparatus of claim 1, wherein the processing circuitry is further configured to:
determine a user-selected zoom ratio, wherein the user-selected zoom ratio equals a first partial zoom ratio multiplied by a second partial zoom ratio;

prior to generating the warp interpolated frame, upscale each frame in the sliding window by the second partial zoom ratio; and generate the warp interpolated frame by: upscaling each frame in the sliding window by the first partial zoom ratio by applying a multi-frame interpolation technique, such that the composite image is scaled to the user-selected zoom ratio.

3. The apparatus of claim 1, wherein the processing circuitry is configured to:
pre-process each frame of the video stream according to the capture frame rate by at least one of: enhancing sharpness or filtering noise of the frame;

control the pre-processing of each frame of the video stream by controlling a sharpness strength based on auto-focus information;

generate the composite image by: applying photometric (PM) alignment and blend techniques to the sliding window according to a rate N times the capture frame rate to match brightness and color to that of a reference frame in the sliding window; and apply feature detection and feature tracking to the video stream to pre-processed frames output from the pre-processing operation.

4. The apparatus of claim 1, wherein the processing circuitry is further configured to:
generate the composite image by: applying a photometric (PM) alignment technique to each frame of the sliding window according to the capture frame rate by adjusting brightness and color of the N frames of the sliding window to a time-varying target.

5. The apparatus of claim 1, wherein the processing circuitry is further configured to: blend the warp interpolated frames corresponding to the sliding window by:
generating local blend statistics including at least one of:
a blending weight, or
a mean motion; and
perform the blending according to a statistical function including at least one of: a mean or a median.

6. The apparatus of claim 1, wherein, to reduce end-to-end latency, the processing circuitry is configured to:
select a reference frame from the sliding window by one of:
selecting a most recent captured frame as the reference frame, or
selecting a center frame from among the N frames as the reference to reduce motion distortion;
generate the composite image by:

post-processing of the single-blended frame, and
controlling a strength of the post-processing by using local motion statistics to control a strength of at least one of:
post-processing noise control,
post-processing sharpness control, or
post-processing contrast control; and
use the output video stream at least one of:
an input of an image signal processor (ISP) of the camera,
an intermediate point in the ISP with intermediate data format, or
execution of a video playback application.

7. The apparatus of claim 1 wherein the processing circuitry is configured to:
control the camera by modifying an image signal processor (ISP) of the camera for at least one of: noise filtering, demosaicing configuration, sharpness enhancement, defect pixel correction, color or exposure;

control the weight of blending of each frame based on camera International Organization of Standardization (ISO) parameters;

operate in High Fidelity (HiFi) video mode based on at least one of:
an automatically selection of the HiFi video mode in response to the user-selected digital zoom ratio exceeding a threshold digital zoom ratio,
an automatically selection of the HiFi video mode based on a pre-selected quality level,
receiving a user input indicating a selection of the HiFi video mode;

determine the camera motion information by using at least one of:
using digital analysis,
inertial measurement received from an inertial measurement unit (IMU), or
video stabilization information from the camera;
identify a presence of Electronic Rolling Shutter (ERS) distortion and determine parameters of the ERS distortion based on the video stream and the camera motion information; and dynamically select the number N of consecutive frames in each sliding window based on at least one of:
a pre-determined calculation of apparatus hardware capabilities,
camera International Organization of Standardization (ISO) parameters, or
scene brightness.

8. The apparatus of claim 1, wherein the processing circuitry is further configured to:
decompose the camera motion information into intended camera motion path and hand-shake camera motion based on the camera motion information,
wherein to make the intended camera motion path aesthetically pleasing, generate a camera stabilization path to be a function of the user intended camera motion path by removing sudden jerks; and
generate the set of warp parameters by: combining warp correction for camera motion with at least one of:
warp correction for camera motion stabilization, or
warp correction for Electronic Rolling Shutter correction.

9. The apparatus of claim 1, wherein the processing circuitry is configured to:

determine to accept or reject each frame in the sliding window based on suitability for blending with other frames in the sliding window;
determine a global frame weight control for each frame in the video stream based on at least one of:
  a sharpness of the frame,
  an estimate of amount of motion in the frame,
  an estimate of amount of noise in the frame,
  a difference of time between the frame and a reference frame in the sliding window, or
  an estimate of amount of details in frame;
adjust the weight of blending of the frame by rejecting each frame in the sliding window that has at least one of:
  a brightness difference that exceeds a predetermined brightness difference threshold,
  a color difference that exceeds a predetermined color difference threshold,
  a motion blur estimate that exceeds a predetermined motion blur threshold,
  a frame contrast and tone that exceeds a frame contrast and tone threshold,
  a frame Electronic Rolling Shutter (ERS) distortion estimate that exceeds an ERS threshold,
  a frame focus difference that exceeds a focus difference threshold,
  a frame feature detection and tracking result reliability that exceeds a frame tracking reliability threshold, or
  a reliability of camera motion parameters that exceeds an affine error threshold or that is outside an tolerable alignment error range; and
adjust the weight of blending of the frame based on an auto-exposure, an auto-focus, and an auto-white/color balance information received from the camera.

10. The apparatus of claim 1, wherein the processing circuitry is further configured to:
select a detection frame rate and a tracking frame rate based on at least one of: a frame tracking reliability threshold, amount of noise, or zoom ratio;
apply feature detection to the video stream according to a detection frame rate;
apply feature tracking to points of the video stream in between applications of feature detection according to a tracking frame rate, wherein the detection frame rate and the tracking frame rate are each less than or equal to the capture frame rate;
buffer a list of points that match from each sliding window, the list of points including feature detection results and feature tracking results; and
provide the list as frame feature information.

11. The apparatus of claim 10, wherein the processing circuitry is further configured to: reset the application of the feature detection and tracking for a sliding window based on at least one of:
an estimate of frame noise,
an estimate of reliability of detection and tracking,
a difference in brightness,
a difference in color,
a difference in focus, or
a camera motion estimate that exceeds a pre-determined threshold.

12. The apparatus of claim 1, wherein, to reduce end-to-end latency, the processing circuitry is configured to:
divide each frame of the sliding window into a number M of slices according to horizontal and vertical dimensions of each frame; and
provide a pipeline, which starts with an $i^{th}$ of the M slices from each frame of the video stream, for:
  pre-processing and a high fidelity zoom at the same time, and
  post-processing at a subsequent time that is prior to providing an $M^{th}$ of the M slices of the frame.

13. The apparatus of claim 12, wherein, to reduce end-to-end latency, the processing circuitry is configured to:
divide each of the M slices from each of the N frames of the sliding window into a number L of tiles;
sequentially provide a pipeline, which starts with N $j^{th}$ tiles, which includes a $j^{th}$ of the L tiles from each $i^{th}$ slice from N frames of the sliding window, to:
  generate N pre-processed $j^{th}$ tiles,
  generate an interpolated $j^{th}$ tile of an interpolated frame by removing a hand-shake camera motion,
  generate an $j^{th}$ single-blended tile according to the weight of blending of each frame in the sliding window, and
  generate a $j^{th}$ composite tile having a user-selected digital zoom ratio;
for an $(i+1)^{th}$ slice or first slice of a next sliding window, repeat the sequential providing; and
complete generation of an $L^{th}$ composite tile of the $M^{th}$ slice of the frame before the completion of generation of N pre-processed $L^{th}$ tiles of the $M^{th}$ slice of a next frame.

14. A method comprising:
capturing, by a camera, a video stream at a capture frame rate;
in order to generate a composite image:
  identifying, in a frame of the video stream captured by the camera, a motion characteristic associated with moving objects in a scene while the camera captured a sliding window of the video stream, and
  for a plurality of frames in the sliding window, controlling, by processing circuitry, a weight of blending of the frame based on the identified motion characteristic to enable the composite image to be generated according to the controlled weights of blending of the plurality of frames in the sliding window
including, by the processing circuitry, at least two frames of the video stream in the sliding window that contains a number N of consecutive frames of the video stream;
determining, by the processing circuitry, camera motion information associated with motion of the camera while the camera captured the video stream;
for each frame in one or more frames of the video stream:
  analyzing, by the processing circuitry, an amount of warp of the frame based on the camera motion information, and
  generating, by the processing circuitry, a set of warp parameters indicating the amount of warp of the frame;
for frames in the sliding window that includes the frame:
  generating, by the processing circuitry, a warp interpolated frame by applying the warp parameters and an image interpolation technique to the frame;
generating the composite image by: blending the warp interpolated frames corresponding to the sliding window into a single-blended frame according to the controlled weight of blending of each frame in the sliding window; and
producing an output video stream including the composite image generated from the sliding window and a subsequent composite image generated from a subsequent sliding window that includes a subsequent N consecutive frames of the video stream.

15. The method of claim 14, further comprising:
determining a user-selected zoom ratio, wherein the user-selected zoom ratio equals a first partial zoom ratio multiplied by a second partial zoom ratio;
prior to generating the warp interpolated frame, upscaling each frame in the sliding window by the second partial zoom ratio; and
generating a warp interpolated frame by: upscaling each frame in the sliding window by the first partial zoom ratio by applying a multi-frame interpolation technique, such that the composite image is scaled to the user-selected zoom ratio.

16. The method of claim 14, further comprising:
pre-processing each frame of the video stream according to the capture frame rate by at least one of: enhancing sharpness or filtering noise of the frame;
controlling the pre-processing of each frame of the video stream by controlling a sharpness strength based on auto-focus information;
generating the composite image by: applying photometric (PM) alignment and blend techniques to the sliding window according to a rate N times the capture frame rate to match brightness and color to that of a reference frame in the sliding window; and
applying feature detection and feature tracking to the video stream to pre-processed frames output from the pre-processing operation.

17. The method of claim 14, further comprising:
generating the composite image by: applying a photometric (PM) alignment technique to each frame of the sliding window according to the capture frame rate by adjusting brightness and color of the N frames of the sliding window to a time-varying target.

18. The method of claim 14, wherein blending the warp interpolated frames corresponding to the sliding window comprises:
generating local blend statistics including at least one of:
a blending weight, or
a mean motion; and
performing the blending according to a statistical function including at least one of:
a mean or a median.

19. The method of claim 14, wherein, to reduce end-to-end latency, the method further comprises:
selecting a reference frame from the sliding window by one of:
selecting a most recent captured frame as the reference frame, or
selecting a center frame from among the N frames as the reference to reduce motion distortion;
generating the composite image by:
post-processing of the single-blended frame, and
controlling a strength of the post-processing by using local motion statistics to controlling a strength of at least one of:
post-processing noise control,
post-processing sharpness control, or
post-processing contrast control; and
using the output video stream at least one of:
an input of an image signal processor (ISP) of the camera,
an intermediate point in the ISP with intermediate data format, or
execution of a video playback application.

20. The method of claim 14 further comprising:
controlling the camera by modifying an image signal processor (ISP) of the camera for at least one of: noise filtering, demosaicing configuration, sharpness enhancement, defect pixel correction, color or exposure;
controlling the weight of blending of each frame based on camera International Organization of Standardization (ISO) parameters;
operating in High Fidelity (HiFi) video mode based on at least one of:
an automatically selection of the HiFi video mode in response to the user-selected digital zoom ratio exceeding a threshold digital zoom ratio,
an automatically selection of the HiFi video mode based on a pre-selected quality level,
receiving a user input indicating a selection of the HiFi video mode;
determining the camera motion information by using at least one of:
using digital analysis,
inertial measurement received from an inertial measurement unit (IMU), or
video stabilization information from the camera;
identifying a presence of Electronic Rolling Shutter (ERS) distortion and determine parameters of the ERS distortion based on the video stream and the camera motion information; and
dynamically selecting the number N of consecutive frames in each sliding window based on at least one of:
a pre-determined calculation of method hardware capabilities,
camera International Organization of Standardization (ISO) parameters, or scene brightness.

21. The method of claim 14, further comprising:
decomposing the camera motion information into intended camera motion path and hand-shake camera motion based on the camera motion information,
wherein to make the intended camera motion path aesthetically pleasing, the method further comprises generating a camera stabilization path to be a function of the user intended camera motion path by removing sudden jerks; and
generating the set of warp parameters by: combining warp correction for camera motion with at least one of:
warp correction for camera motion stabilization, or
warp correction for Electronic Rolling Shutter correction.

22. The method of claim 14, further comprising:
determine to accept or reject each frame in the sliding window based on suitability for blending with other frames in the sliding window;
determine a global frame weight control for each frame in the video stream based on at least one of:
a sharpness of the frame,
an estimate of amount of motion in the frame,
an estimate of amount of noise in the frame,
a difference of time between the frame and a reference frame in the sliding window, or
an estimate of amount of details in frame;
adjust the weight of blending of the frame by rejecting each frame in the sliding window that has at least one of:
a brightness difference that exceeds a predetermined brightness difference threshold,
a color difference that exceeds a predetermined color difference threshold, a motion blur estimate that exceeds a predetermined motion blur threshold,
a frame contrast and tone that exceeds a frame contrast and tone threshold,
a frame Electronic Rolling Shutter (ERS) distortion estimate that exceeds an ERS threshold,
a frame focus difference that exceeds a focus difference threshold,
a frame feature detection and tracking result reliability that exceeds a frame tracking reliability threshold, or
a reliability of camera motion parameters that exceeds an affine error threshold or that is outside an tolerable alignment error range; and
adjust the weight of blending of the frame based on an auto-exposure, an auto-focus, and an auto-white/color balance information received from the camera.

23. The method of claim 14, further comprising:
selecting a detection frame rate and a tracking frame rate based on at least one of: a frame tracking reliability threshold, amount of noise, or zoom ratio;
applying feature detection to the video stream according to a detection frame rate;
applying feature tracking to points of the video stream in between applications of feature detection according to a tracking frame rate, wherein the detection frame rate and the tracking frame rate are each less than or equal to the capture frame rate;
buffering a list of points that match from each sliding window, the list of points including feature detection results and feature tracking results; and
providing the list as frame feature information.

24. The method of claim 23, further comprising: resetting the application of the feature detection and tracking for a sliding window based on at least one of:
an estimate of frame noise,
an estimate of reliability of detection and tracking,
a difference in brightness,
a difference in color,
a difference in focus, or
a camera motion estimate that exceeds a pre-determined threshold.

25. The method of claim 14, wherein, to reduce end-to-end latency, the method further comprises:
dividing each frame of the sliding window into a number M of slices according to horizontal and vertical dimensions of each frame; and
providing a pipeline, which starts with an $i^{th}$ of the M slices from each frame of the video stream, for:
pre-processing and a high fidelity zoom at the same time, and
post-processing at a subsequent time that is prior to providing a $M^{th}$ of the M slices of the frame.

26. The method of claim 25, wherein, to reduce end-to-end latency, the method further comprises:
divide each of the M slices from each of the N frames of the sliding window into a number L of tiles;
sequentially provide a pipeline, which starts with N $j^{th}$ tiles, which includes a $j^{th}$ of the L tiles from each $i^{th}$ slice from N frames of the sliding window, to:
generate N pre-processed $j^{th}$ tiles,
generate an interpolated $j^{th}$ tile of an interpolated frame by removing a hand-shake camera motion,
generate an $j^{th}$ single-blended tile according to the weight of blending of each frame in the sliding window, and
generate a $j^{th}$ composite tile having a user-selected digital zoom ratio;
for an $(i+1)^{th}$ slice or first slice of a next sliding window, repeat the sequential providing; and
complete generation of an $L^{th}$ composite tile of the $M^{th}$ slice of the frame before the completion of generation of N pre-processed $L^{th}$ tiles of the $M^{th}$ slice of a next frame.

27. A non-transitory computer readable medium embodying a computer program, the computer program comprising computer readable program code that, when executed, causes at least one processing device to:
in order to generate a composite image:
identify, in a frame of a video stream captured by a camera, a motion characteristic associated with moving objects in a scene while the camera captured a sliding window of the video stream; and
for a plurality of frames in the sliding window, control a weight of blending of the frame based on the identified motion characteristic to enable the composite image to be generated according to the controlled weights of blending of the plurality of frames;
include at least two frames of the video stream in the sliding window that contains a number N of consecutive frames of the video stream, wherein the video stream is captured by a camera at a capture frame rate;
determine camera motion information associated with motion of the camera while the camera captured the video stream;
for each frame in one or more frames of the video stream:
analyze an amount of warp of the frame based on the camera motion information, and
generate a set of warp parameters indicating the amount of warp of the frame;
for frames in the sliding window that includes the frame:
generate a warp interpolated frame by applying the warp parameters and an image interpolation technique to the frame;
generate the composite image by: blending the warp interpolated frames corresponding to the sliding window into a single-blended frame according to the controlled weight of blending of each frame in the sliding window; and
produce an output video stream including the composite image generated from the sliding window and a subsequent composite image generated from a subsequent sliding window that includes a subsequent N consecutive frames of the video stream.

28. The non-transitory computer readable medium of claim 27, wherein the computer program further comprises computer readable program code that, when executed, causes the at least one processing device to:
determine a user-selected zoom ratio, wherein the user-selected zoom ratio equals a first partial zoom ratio multiplied by a second partial zoom ratio;
prior to generating the warp interpolated frame, upscale each frame in the sliding window by the second partial zoom ratio; and
generate the warp interpolated frame by: upscaling each frame in the sliding window by the first partial zoom ratio by applying a multi-frame interpolation technique, such that the composite image is scaled to the user-selected zoom ratio.

29. The non-transitory computer readable medium of claim 27, wherein the computer program further comprises computer readable program code that, when executed, causes the at least one processing device to:

pre-process each frame of the video stream according to the capture frame rate by at least one of: enhancing sharpness or filtering noise of the frame;
control the pre-processing of each frame of the video stream by controlling a sharpness strength based on auto-focus information;
generate the composite image by: applying photometric (PM) alignment and blend techniques to the sliding window according to a rate N times the capture frame rate to match brightness and color to that of a reference frame in the sliding window; and
apply feature detection and feature tracking to the video stream to pre-processed frames output from the pre-processing operation.

30. The non-transitory computer readable medium of claim 27, wherein the computer program further comprises computer readable program code that, when executed, causes the at least one processing device to:
generate the composite image by: applying a photometric (PM) alignment technique to each frame of the sliding window according to the capture frame rate by adjusting brightness and color of the N frames of the sliding window to a time-varying target.

31. The non-transitory computer readable medium of claim 27, wherein the computer program further comprises computer readable program code that, when executed, causes the at least one processing device to: blend the warp interpolated frames corresponding to the sliding window by:
generating local blend statistics including at least one of:
a blending weight, or
a mean motion; and
perform the blending according to a statistical function including at least one of: a mean or a median.

32. The non-transitory computer readable medium of claim 27, wherein, to reduce end-to-end latency, the computer program further comprises computer readable program code that, when executed, causes the at least one processing device to:
select a reference frame from the sliding window by one of:
selecting a most recent captured frame as the reference frame, or
selecting a center frame from among the N frames as the reference to reduce motion distortion;
generate the composite image by:
post-processing of the single-blended frame, and
controlling a strength of the post-processing by using local motion statistics to control a strength of at least one of:
post-processing noise control,
post-processing sharpness control, or
post-processing contrast control; and
use the output video stream at least one of:
an input of an image signal processor (ISP) of the camera,
an intermediate point in the ISP with intermediate data format, or
execution of a video playback application.

33. The non-transitory computer readable medium of claim 27, wherein the computer program further comprises computer readable program code that, when executed, causes the at least one processing device to:
decompose the camera motion information into intended camera motion path and hand-shake camera motion based on the camera motion information;
wherein to make the intended camera motion path aesthetically pleasing, generate a camera stabilization path to be a function of the user intended camera motion path by removing sudden jerks; and
generate the set of warp parameters by: combining warp correction for camera motion with at least one of:
warp correction for camera motion stabilization, or
warp correction for Electronic Rolling Shutter correction.

34. The non-transitory computer readable medium of claim 27, wherein the computer program further comprises computer readable program code that, when executed, causes the at least one processing device to:
select a detection frame rate and a tracking frame rate based on at least one of: a frame tracking reliability threshold, amount of noise, or zoom ratio;
apply feature detection to the video stream according to a detection frame rate;
apply feature tracking to points of the video stream in between applications of feature detection according to a tracking frame rate, wherein the detection frame rate and the tracking frame rate are each less than or equal to the capture frame rate;
buffer a list of points that match from each sliding window, the list of points including feature detection results and feature tracking results; and
provide the list as frame feature information.

35. The non-transitory computer readable medium of claim 34, wherein the computer program further comprises computer readable program code that, when executed, causes the at least one processing device to: reset the application of the feature detection and tracking for a sliding window based on at least one of:
an estimate of frame noise,
an estimate of reliability of detection and tracking,
a difference in brightness,
a difference in color,
a difference in focus, or
a camera motion estimate that exceeds a pre-determined threshold.

36. The non-transitory computer readable medium of claim 27, wherein, to reduce end-to-end latency, the computer program further comprises computer readable program code that, when executed, causes the at least one processing device to:
divide each frame of the sliding window into a number M of slices according to horizontal and vertical dimensions of each frame; and
provide a pipeline, which starts with an $i^{th}$ of the M slices from each frame of the video stream, for:
pre-processing and a high fidelity zoom at the same time, and
post-processing at a subsequent time that is prior to providing an $M^{th}$ of the M slices of the frame.

37. The non-transitory computer readable medium of claim 36, wherein, to reduce end-to-end latency, the computer program further comprises computer readable program code that, when executed, causes the at least one processing device to:
divide each of the M slices from each of the N frames of the sliding window into a number L of tiles;
sequentially provide a pipeline, which starts with N $j^{th}$ tiles, which includes a $j^{th}$ of the L tiles from each $i^{th}$ slice from N frames of the sliding window, to:
generate N pre-processed $j^{th}$ tiles,
generate an interpolated $j^{th}$ tile of an interpolated frame by removing a hand-shake camera motion, generate an $j^{th}$ single-blended tile according to the weight of blending of each frame in the sliding window, and generate a $j^{th}$ composite tile having a user-selected digital zoom ratio;

for an $(i+1)^{th}$ slice or first slice of a next sliding window, repeat the sequential providing; and complete generation of an $L^{th}$ composite tile of the $M^{th}$ slice of the frame before the completion of generation of N pre-processed $L^{th}$ tiles of the $M^{th}$ slice of a next frame.

* * * * *